(12) United States Patent
Kawakita

(10) Patent No.: US 11,689,547 B2
(45) Date of Patent: Jun. 27, 2023

(54) INFORMATION ANALYSIS SYSTEM, INFORMATION ANALYSIS METHOD, AND RECORDING MEDIUM

(71) Applicant: NEC Corporation, Tokyo (JP)

(72) Inventor: Masaru Kawakita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 16/060,090

(22) PCT Filed: Dec. 13, 2016

(86) PCT No.: PCT/JP2016/087043
§ 371 (c)(1),
(2) Date: Jun. 7, 2018

(87) PCT Pub. No.: WO2017/104655
PCT Pub. Date: Jun. 22, 2017

(65) Prior Publication Data
US 2018/0367558 A1   Dec. 20, 2018

(30) Foreign Application Priority Data
Dec. 14, 2015   (JP) .................. 2015-243208

(51) Int. Cl.
*G06F 21/00*   (2013.01)
*H04L 9/40*   (2022.01)
(Continued)

(52) U.S. Cl.
CPC ...... *H04L 63/1425* (2013.01); *G06F 16/2477* (2019.01); *G06F 21/577* (2013.01);
(Continued)

(58) Field of Classification Search
CPC .............. H04L 63/1425; H04L 41/142; H04L 63/1416; G06F 16/2477; G06F 40/20; G06F 21/577
See application file for complete search history.

(56) References Cited

U.S. PATENT DOCUMENTS 8,676,795 B1 * 3/2014 Durgin .................. G06F 40/216
707/750
9,002,892 B2 * 4/2015 Benyamin ............... G06F 16/31
707/791

(Continued)

FOREIGN PATENT DOCUMENTS

JP   H10-207910 A   8/1998
JP   2002269489 A   9/2002

(Continued)

OTHER PUBLICATIONS

Yoshihara, A., et al., "News kiji no jikanteki tokusei o kouryo shita kabuka doukou yosoku",The Special Interest Group Technical Reports of Information Processing Society of Japan, Mathematical Modeling and Problem Solving, vol. 2015-MPS-102, No. 4, Feb. 2015, pp. 1-6.

(Continued)

*Primary Examiner* — Trong H Nguyen
*Assistant Examiner* — Michael M Lee
(74) *Attorney, Agent, or Firm* — Sughrue Mion, PLLC

(57) ABSTRACT

To detect information relating to the threat appropriately, based on an appearance tendency of information related to a threat in security. Information analysis system includes: an information storing unit that stores reference information acquired from an information source; and an information analysis unit that analyzes an appearance tendency of first phrase information that is included in the reference information acquired at chronologically different timings and that represents a phrase related to security and extracts reference (Continued)

information including the first phrase information the appearance tendency of which has changed from the information storing unit.

15 Claims, 23 Drawing Sheets

(51) Int. Cl.
| | | |
|---|---|---|
| G06F 16/2458 | (2019.01) | |
| G06F 21/57 | (2013.01) | |
| G06F 40/258 | (2020.01) | |
| G06F 40/237 | (2020.01) | |
| H04L 41/142 | (2022.01) | |

(52) U.S. Cl.
CPC .......... *G06F 40/237* (2020.01); *G06F 40/258* (2020.01); *H04L 41/142* (2013.01); *H04L 63/1416* (2013.01); *G06F 2221/034* (2013.01)

(56) References Cited

U.S. PATENT DOCUMENTS

| | | | | |
|---|---|---|---|---|
| 9,892,168 | B1* | 2/2018 | Apreleva | G06N 7/005 |
| 2012/0011158 | A1* | 1/2012 | Avner | G06F 16/374 |
| | | | | 707/777 |
| 2013/0159505 | A1* | 6/2013 | Mason | G06Q 10/00 |
| | | | | 709/224 |
| 2014/0324966 | A1* | 10/2014 | Farnham | H04L 51/20 |
| | | | | 709/204 |
| 2015/0066725 | A1* | 3/2015 | Cai | G06Q 40/04 |
| | | | | 705/37 |
| 2015/0106157 | A1* | 4/2015 | Chang | G06Q 30/0201 |
| | | | | 705/7.29 |
| 2015/0356101 | A1* | 12/2015 | Cohen | G06F 16/9535 |
| | | | | 707/722 |
| 2016/0140344 | A1* | 5/2016 | Sato | G06F 21/577 |
| | | | | 726/22 |
| 2016/0366174 | A1* | 12/2016 | Chernin | H04L 29/06965 |
| 2017/0061132 | A1* | 3/2017 | Hovor | G06F 3/04847 |

FOREIGN PATENT DOCUMENTS

| | | | |
|---|---|---|---|
| JP | 2005514673 | A | 5/2005 |
| JP | 2008197877 | A | 8/2008 |
| JP | 2009110334 | A | 5/2009 |
| JP | 2009199341 | A | 9/2009 |
| JP | 2010-286888 | A | 12/2010 |
| JP | 2012008900 | A * | 1/2012 |
| JP | 2014-096003 | A | 5/2014 |
| WO | 2014208427 | A1 | 12/2014 |

OTHER PUBLICATIONS

Tokunaga, H., et al., "Extraction of the Development Tendency from Software Product News Article", The Special Interest Group Technical Reports of Information Processing Society of Japan, vol. 2004, No. 1, Jan. 2004, pp. 13-18.

Kumagai, A., et al., "A Method to Extract Security-Related Tweets", The Technical Report of The Proceeding of The Institute of Electronics, Information and Communication Engineers, Oct. 2014, vol. 114, No. 253, pp. 13-18.

Han, J.-G., et al., "Real time gata daikibo data shori kiban Jubatus to sono katsuyo jirei ni tsuite", Operations research as a management science research, Dec. 2012, vol. 57, No. 12, pp. 689-694 (33-38).

International Preliminary Report on Patentability and Translation of Written Opinion, dated Jun. 19, 2018 from the International Bureau in counterpart International application No. PCT/JP2016/087043.

International Search Report dated Feb. 28, 2017 from the International Bureau in counterpart International application No. PCT/JP2016/087043.

Japanese Office Action for JP Application No. 2017-556065 dated Nov. 4, 2020 with English Translation.

Nakamura et al., "Proposal of Detection Method of Blog Spam Based on Categorizalion and Time Series Information", Journal of the Information Processing Society of Japan, Information Processing Society of Japan, Mar. 15, 2008, the 49th volume, No. 3. p. 1119-1130, Japan.

Japanese Office Action for JP Application No. 2021-018933 dated Dec. 7, 2021 with English Translation.

* cited by examiner

Fig. 4

REFERENCE INFORMATION S1

```
***** C ************ X ************
** A ************************ A ***
**************** B *************
***** C ************************
* A ******* B ****************
************* B ******** X *******
********* B *** C **************
*********************************
**** A ······
```

REFERENCE INFORMATION S2

INFORMATION DATABASE

SOCIAL MEDIA INFORMATION

| No | PROVISION DATE/TIME OR ACQUISITION DATE/TIME | SENDER | CONTENT |
|---|---|---|---|
| 1 | 2015-11-** 04:57:00+09:00 | J**** | ***** Dyreza which uses vulnerability: https://aaa.bbb/ccc #vulnerability |
| 2 | 2015-11-** 04:10:33+09:00 | e**** | Dyreza Malware ****:https://aaa.bbb/ccc #vulnerability |
| 3 | 2015-11-** 02:15:47+09:00 | R**** | *** Dyreza: **** Botnet ***** in vulnerability https://aaa.bbb/ccc #vulnerability |
| 4 | 2015-11-** 01:36:34+09:00 | i**** | RT **** about #Dyreza #malware -- a look at https://aaa.bbb/ccc |
| 5 | 2015-11-** 01:28:41+09:00 | m**** | RT ****:t Dyreza and vulnerability: https://aaa.bbb/ccc *** #vulnerability |
| ... | ... | ... | ... |

```
<cybox:Object id="*****">
<cybox:Properties xsi:type="NetworkConnectionObj:NetworkConnectionObjectType">
<NetworkConnectionObj:Destination_Socket_Address xsi:type="SocketAddressObj:SocketAddressObjectType">
<SocketAddressObj:IP_Address xsi:type="AddressObj:AddressObjectType">
<AddressObj:Address_Value condition="Contains">***.***.***.*** </AddressObj:Address_Value>
</SocketAddressObj:IP_Address>
</NetworkConnectionObj:Destination_Socket_Address>
</cybox:Properties>
</cybox:Object>
```

Fig. 18

```
<cybox:Object id="*****">
<cybox:Properties xsi:type="FileObj:FileObjectType">
<FileObj:File_Name condition="Contains">****.exe</FileObj:File_Name>
</cybox:Properties>
</cybox:Object>
```

INFORMATION ANALYSIS SYSTEM, INFORMATION ANALYSIS METHOD, AND RECORDING MEDIUM

This application is a National Stage Entry of PCT/JP2016/087043 filed on Dec. 13, 2016, which claims priority from Japanese Patent Application 2015-243208 filed on Dec. 14, 2015, the contents of all of which are incorporated herein by reference, in their entirety.

TECHNICAL FIELD

The present invention relates to an information analysis system and the like that are capable of detecting information relating to a threat in security.

BACKGROUND ART

Recently, threats, such as a malicious program (hereinafter, referred to as malware), that provide malicious instructions to an information processing device (a computer and the like) have become a social problem. In order to reduce damage caused by such threats, it is preferable to detect malware and the like as promptly as possible and remove the detected malware from the information processing device.

In many cases, information on signs and a method of a cyberattack using malware and the like is sent from various types of information sources. Such information sources include, for example, public information such as social media and weblogs, notifications from security vendors and research institutions, non-public information that is shared among specific individuals or organizations, and the like. Technologies for using information relating to security provided from various types of information sources are disclosed in the following PTLs.

PTL 1 discloses a technology relating to a system that collects other security information related to some security information. The system disclosed in PTL 1, using keywords individually extracted from a piece of reference source security information input from a terminal and a piece of security information collected from a server, calculates a degree of relationship between the pieces of information. The system is aimed at collecting pieces of security information that have a strong relationship with one another.

PTL 2 discloses a system that, when received communication data include characteristics similar to characteristics included in public security information, performs predetermined processing (communication shut-off and the like) according to the degree of reliability of the security information. The system disclosed in PTL 2 is aimed at preventing a security incident from occurring by, when having received communication data including specific characteristics, determining whether or not to continue the communication.

PTL 3 discloses a technology relating to a system that specifies pages including vulnerability information out of World Wide Web (Web) pages collected through Web crawling and specifies a reference relationship between the Web pages including the vulnerability information. Such a system, with respect to each Web page including vulnerability information, by counting the number of times when reference is performed from the Web page and the number of times when the Web page is referred to, determines a degree of importance of the Web page.

Note that, although not a technology using information relating to security, PTL 4 discloses a technology of adding domain-specific semantic information to information provided from an information source.

CITATION LIST

Patent Literature

[PTL 1] WO 2014/208427 A
[PTL 2] JP 2009-110334 A
[PTL 3] JP 2008-197877 A
[PTL 4] JP 2005-514673 A

SUMMARY OF INVENTION

Technical Problem

To cope with cyberattacks appropriately, obtaining information relating to a threat in security at the right time is required. That is, detecting information indicating signs of occurrence of a threat (for example, a cyberattack and the like) properly and, in conjunction therewith, obtaining various types of information relating to the threat appropriately are required. This is because there is a possibility that, as the period of time from an occurrence of a threat, such as a cyberattack, to acquisition of information relating to the threat increases, damage therefrom becomes larger.

However, when knowledge and experience of a person in charge on the side of defending an information system (hereinafter, referred to as a person in charge on the defense side), such as a manager of the information system, are not sufficient, it is not always easy to detect signs of occurrence of a threat and the like at the right time and collect information relating to the threat. For this reason, there has been a problem in that a person in charge on the defense side sometimes cannot detect appropriate information relating to a threat at the right time. On the other hand, none of the above-described related technologies is a technology of detecting an occurrence of a threat and the like at the right time and is always capable of acquiring information relating to the threat at the right time.

The present invention has been made in consideration of the above-described situation. That is, one of the main objects of the present invention is to provide a system and the like that are capable of, from an appearance tendency of information related to a threat in security, detecting information likely to be the threat appropriately.

Solution to Problem

To achieve the objective shown above, an aspect of the present invention is an information analysis system. The system includes:

an information storing unit that stores reference information acquired from an information source; and an information analysis unit that analyzes an appearance tendency of first phrase information that is included in the reference information acquired at chronologically different timings and that represents a phrase related to security and extracts the reference information including the first phrase information the appearance tendency of which has changed from the information storing unit.

An aspect of the present invention is an information analysis method. The method includes:

analyzing an appearance tendency of first phrase information that is included in reference information acquired at chronologically different timings from an information source and that represents a phrase related to security; and extracting reference information including the first phrase information the appearance tendency of which has changed.

Another aspect of the present invention is an information analysis method. The method includes:

analyzing an appearance tendency of first phrase information that is included in reference information acquired at chronologically different timings from an information source and that represents a phrase related to security; and displaying at least any of the first phrase information the appearance tendency of which has changed, reference information including the first phrase information the appearance tendency of which has changed, and an analysis result on an appearance tendency relating to the first phrase information.

Another aspect of the present invention is an information analysis method. The method includes:

analyzing an appearance tendency of first phrase information that is included in reference information acquired at chronologically different timings from an information source and that represents a phrase related to security;

extracting second phrase information that is included in the reference information and that has a relationship with the first phrase information and analyzing an appearance tendency of the second phrase information; and displaying at least any of the first phrase information or the second phrase information the appearance tendency of which has changed, reference information including the first phrase information or the second phrase information the appearance tendency of which has changed, and an analysis result on an appearance tendency relating to the first phrase information or the second phrase information.

In addition, the object may also be achieved by a computer program achieving an information analysis system and an information analysis method including the above-described configuration using a computer, a computer-readable recording medium storing the computer program, and the like.

Advantageous Effects of Invention

The present invention enables, based on an appearance tendency of information related to a threat in security, information relating to the threat to be detected appropriately.

BRIEF DESCRIPTION OF DRAWINGS

FIG. 4 is an explanatory diagram conceptually illustrating phrases included in pieces of reference information in the first example embodiment of the present invention;

FIG. 12 is an explanatory diagram illustrating a specific example of information stored in an information database in a specific example described in the first example embodiment of the present invention;

FIG. 17 is an explanatory diagram (part 1) illustrating a specific example of a portion of threat description data generated by the information analysis system in the specific example described in the first example embodiment of the present invention;

FIG. 18 is an explanatory diagram (part 2) illustrating a specific example of another portion of the threat description data generated by the information analysis system in the specific example described in the first example embodiment of the present invention;

DESCRIPTION OF EMBODIMENTS

Figure 1:
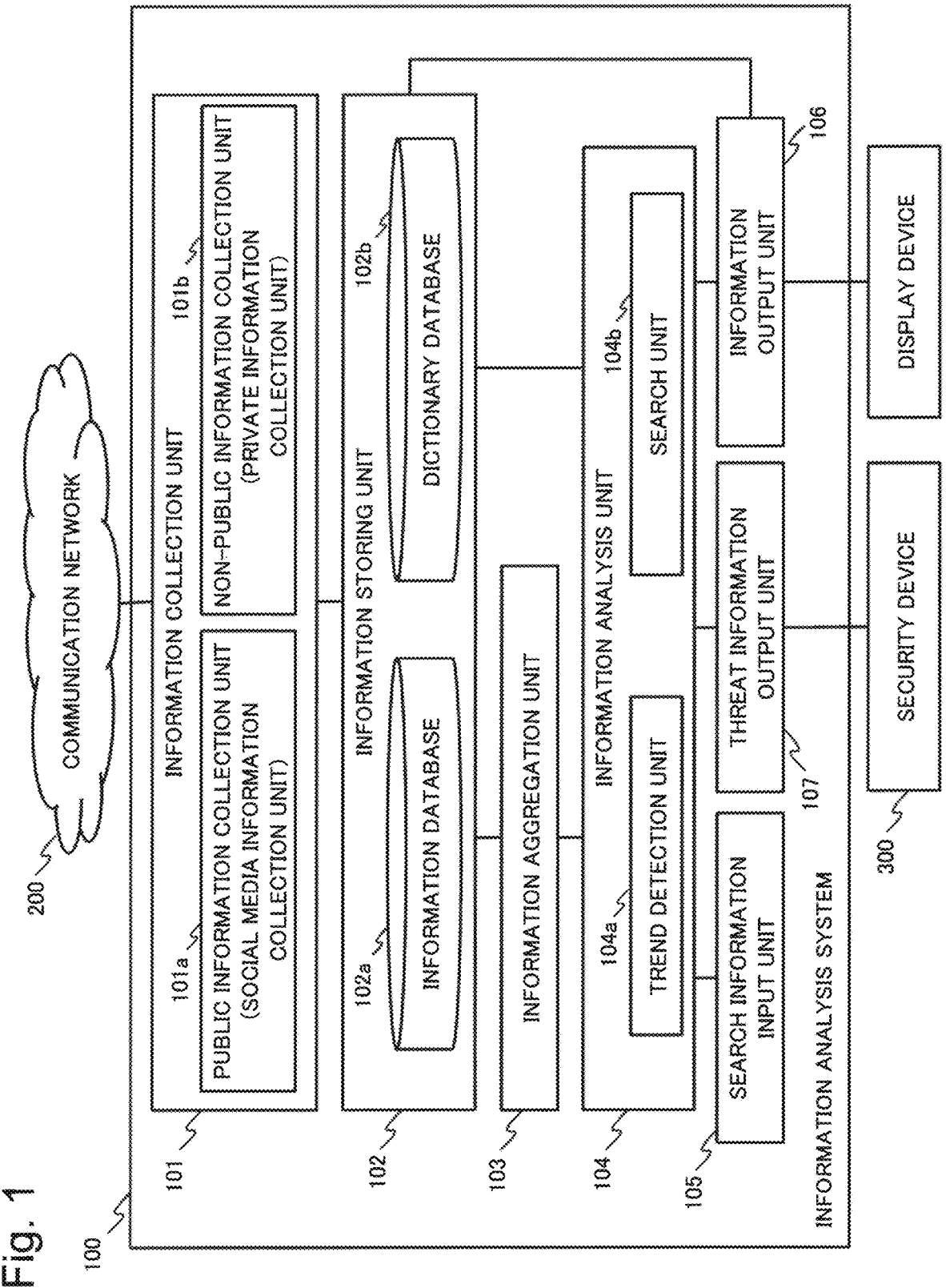
FIG. 1 is a block diagram exemplifying a functional configuration of an information analysis system in a first example embodiment of the present invention.
Figure 2:
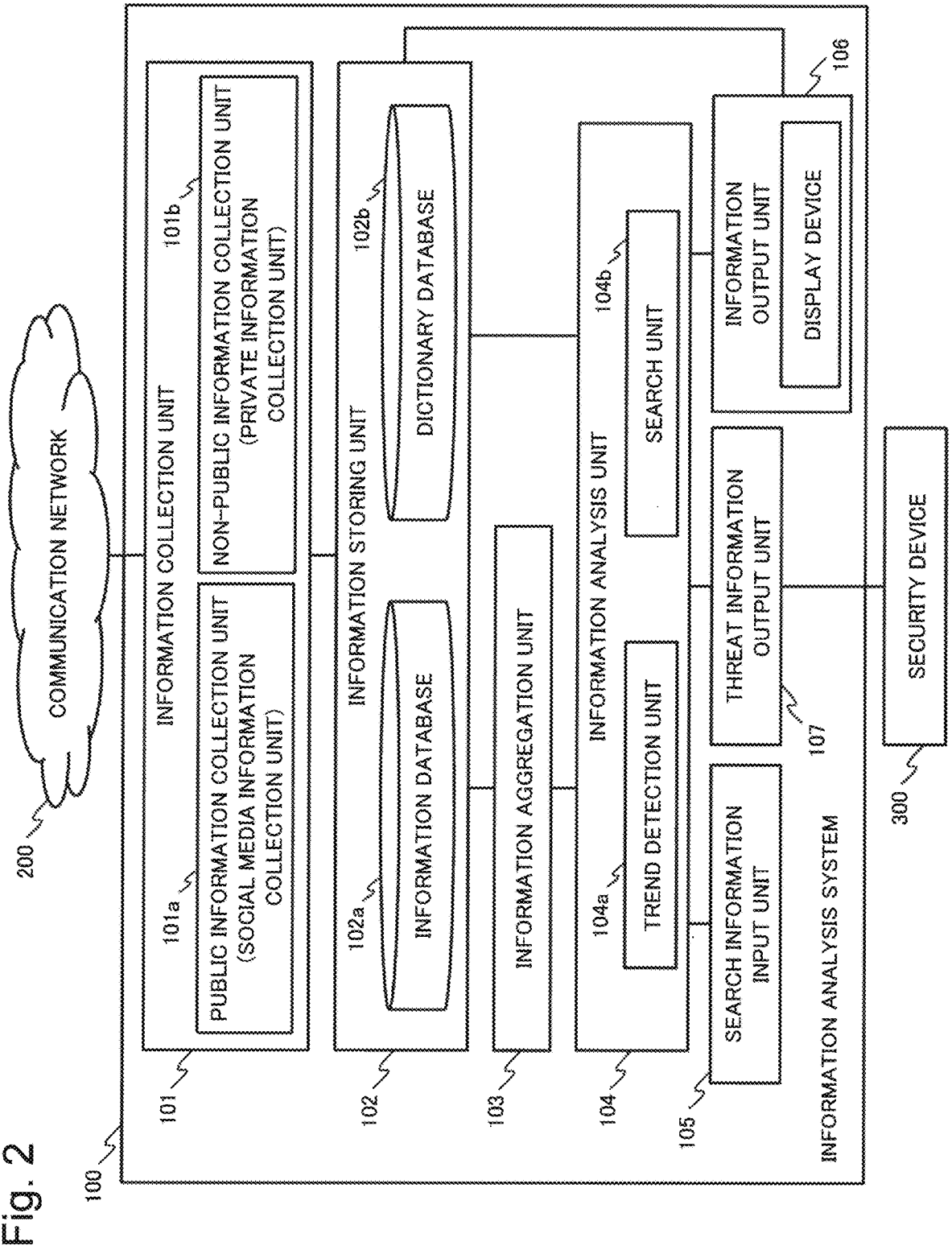
FIG. 2 is a block diagram exemplifying another functional configuration of the information analysis system in the first example embodiment of the present invention.

In advance of a description of example embodiments of the present invention, technical considerations relating to the present invention will be described in more detail.

As described above, in order to cope with a threat such as a cyberattack appropriately, a person in charge on the defense side is required to obtain information relating to the threat (hereinafter, sometimes referred to as "threat information") at the right time. Threat information, relating to signs and a method of a cyberattack, has the characteristics of gradually spreading as time passes from various types of information sources as described above. That is, if being able to detect threat information at an early stage after the threat information was generated (or spread), the person in charge on the defense side can, for example, cope with the cyberattack and the other threat promptly.

If being able to collect information relating to a cyberattack as described above, for example, from the viewpoints of both the attacker side and the defense side and update the information at any time, the person in charge on the defense side is considered to be able to detect threat information promptly. From the viewpoint of the attacker side, information on, for example, behavior and a method of an attacker, a vulnerability of a target system, or the like can be collected. On the other hand, from the viewpoint of the defense side of an information system, information on, for example, signs for detecting a cyberattack, a problem caused by the cyberattack, a countermeasure against the cyberattack, and the like can be collected.

In general, many attackers have a high level of knowledge relating to security. Such an attacker performs an attack by understanding acquired information relating to an attack method and imitating or applying the attack method. In addition, such an attacker is considered to be organizing or retaining available threat information at any time.

On the other hand, a person in charge on the defense side is sometimes, for example, a person in charge in an information system department in a corporation who is not an expert on security. Therefore, the knowledge level on security or the acquisition capability of threat information of a person in charge on the defense side varies. That is, it is sometimes not easy for a person in charge on the defense side to acquire, at the right time, and understand threat information from various viewpoints as described above and appropriately manage such information. Because of the above conditions, in relation to detection of and coping with threat information by a person in charge on the defense side, a system as described below is required to be achieved.

First, a system that is capable of, after a threat, such as a cyberattack, has been generated by an attacker, detecting threat information relating to the threat at an appropriate time (for example, at as early a time as possible) is required to be achieved. In recent years, caused by an increase in the number of threats, diversification in acquisition routes of threat information, or the like, the period of time from a threat being generated to the threat being detected has been in a tendency to be prolonged. Accordingly, a system by which a person in charge on the defense side is able to detect threat information at the right time and acquire related information is required to be achieved.

Second, a system that, when a threat, such as a cyberattack, is detected, assists a person in charge on the defense side in confirming information relating to the threat appropriately is required to be achieved. When a person in charge on the defense side has insufficient practical experience, it is often difficult to appropriately acquire and confirm information relating to a threat. In this case, there is a possibility that more chances for attack are given to an attacker and damage becomes large. Accordingly, a system that enables related information, including a countermeasure against the threat, to be confirmed easily and appropriately is required to be achieved.

Third, a system that, when a threat, such as a cyberattack, occurs, enables a security measure to be performed easily based on information confirmed by a person in charge on the defense side is required to be achieved. For example, when each security device disposed in an information system has a different piece of setup data (setup file), a person in charge on the defense side is required to adjust the setup data manually. In this case, time and the number of hours are required for setup. Accordingly, a system that enables security measures for the respective security devices to be performed promptly and easily is required to be achieved.

Hereinafter, using respective example embodiments, an information analysis system with the above-described technical considerations taken into consideration will be described specifically. The above information analysis system may, for example, based on an appearance tendency (trend) of data related to security, detect an occurrence, spreading, subsidence, and the like of threat information at the right time. The information analysis system may, for example, collectively provide a person in charge on the defense side with information related to a threat and enables the person in charge on the defense side to confirm the threat information appropriately and easily. The information analysis system may also provide standardized data that enables a specific security setting to be applied to a security device.

Note that a configuration of an information analysis system described in each of the following example embodiments is only an exemplification and the technical scope of the present invention is not limited thereto. The division into components (for example, partitioning into functional units) constituting an information analysis system in each of the following example embodiments is an example that enables the information analysis system to be achieved. The implementation of the information analysis system is not limited to the following exemplification and various configurations may be assumed. That is, the components constituting an information analysis system in each of the following example embodiments may be further partitioned and one or more components may be merged.

Each information analysis system described below may be configured using a single body device (physical or virtual device) or achieved using a plurality of separate devices (physical or virtual devices). When the information analysis system is configured with a plurality of devices, the respective devices may be interconnected in a communicable manner using a wired communication network (communication line), a wireless communication network, or an appropriate combination thereof. Such a communication network may be a physical communication network or a virtual communication network. A hardware configuration that enables information analysis systems or the components thereof, described below, to be achieved will be described later.

First Example Embodiment

[Description of Configuration]

Hereinafter, an example embodiment of the present invention will be described in detail with reference to the drawings. FIG. 1 is a block diagram exemplifying a functional configuration of an information analysis system 100 in the present example embodiment.

As exemplified in FIG. 1, the information analysis system 100 according to a first example embodiment is connected to a communication network 200 in a communicable manner.

The communication network 200 may be a wide area network such as the Internet, a local area network such as an intra-company local area network (LAN), or a network made up of an appropriate combination thereof. Alternatively, the communication network 200 may be a virtual communication network that is provided using a well-known virtualized infrastructure.

Hereinafter, a configuration of the information analysis system 100 in the present example embodiment will be described. As exemplified in FIG. 1, the information analysis system 100 includes an information collection unit 101, an information storing unit 102, an information aggregation unit 103, and an information analysis unit 104. The information analysis system 100 may also include a search information input unit 105, an information output unit 106, and a threat information output unit 107. These components constituting the information analysis system 100 may be interconnected using an appropriate communication method in a communicable manner. Hereinafter, each component will be described.

The information collection unit 101 acquires information (data) provided from various types of information sources connected thereto via the communication network 200. Information sources from which the information collection unit 101 acquires various types of information may, for example, be determined in advance through a setup and the like. In addition, using a link information (for example, a hyperlink) included in information acquired from an information source, the information collection unit 101 may further acquire information from another information source.

Information (data) that the information collection unit 101 collects from information sources may be, for example, text data, such as a hyper text markup language (HTML) text and an extensible markup language (XML) text. In addition, data collected from information sources are not limited to the above data and may be binary data, such as image (drawing) data, video data, voice data, and an executable file (for example, an executable file of malware).

The information collection unit 101 may acquire all information provided from information sources or a portion thereof. The information collection unit 101 may also acquire only information including a specific phrase (for example, a search word stored in a dictionary database, which will be described later) from information sources. Further, the information collection unit 101 may, for example, search for information including a specific phrase using such as a search engine that is capable of searching information published on the communication network 200 and, using a result of the search, collect various types of information. Hereinafter, a configuration example of the information collection unit 101 in the present example embodiment will be described.

The information collection unit 101 includes a public information collection unit 101a and a non-public information collection unit 101b. The public information collection unit 101a acquires public information (data) via the communication network 200. The public information collection unit 101a, for example, uses social media, such as a weblog, a social networking service (SNS), and an electronic bulletin board, as information sources and acquires various types of information from the information sources. Alternatively, the public information collection unit 101a, using, for example, Web sites provided by security vendors, research institutes, and the like as information sources, acquires various types of information from the information sources. Specifically, the public information collection unit 101a acquires the above-described various types of information from, for example, information processing devices such as servers providing the above-described various types of services. Note that information sources from which the public information collection unit 101a acquires information are not limited to the above information sources and may include other social media and the like.

Timings at which the public information collection unit 101a acquires various types of information from various types of information sources may be set appropriately. For example, the public information collection unit 101a may acquire various types of information from the above-described information sources at periodic intervals. The public information collection unit 101a may also acquire various types of information from the above-described information sources at timings set by users and the like of the information analysis system 100.

The public information collection unit 101a provides the information storing unit 102 (an information database 102a), which will be described later, with acquired various types of information. The public information collection unit 101a may also provide the information storing unit 102 with, as threat information, information including search words stored in a dictionary database 102b, which will be described later, out of the various types of information acquired from information sources. The public information collection unit 101a may store each piece of acquired various types of information in conjunction with a piece of information capable of specifying an information source and a piece of information indicating a time (a date and time) relating to the piece of acquired various types of information in the information database 102a. The above-described time relating to a piece of various types of information may, for example, represent a time at which the piece of information is acquired, a time at which the piece of information is created, or a time at which the piece of information is made public.

The non-public information collection unit 101b acquires various types of information from non-public information sources (private information sources) via the communication network 200. The non-public information collection unit 101b may, for example, acquire various types of information from, as a non-public information source, a specific site shared with a partner in a trusted relationship (for example, a shared folder or a shared Web site connected to the communication network 200). Specifically, the non-public information collection unit 101b acquires the above-described various types of information from, for example, information processing devices such as servers providing the above-described various types of services (a shared folder, a shared Web site, or other service).

Timings at which the non-public information collection unit 101b acquires various types of information from various types of information sources may be set appropriately. The non-public information collection unit 101b may acquire various types of information from non-public information sources, for example, at periodic intervals. The non-public information collection unit 101b may also acquire various types of information from the above-described information sources, for example, at timings set by users and the like of the information analysis system 100.

The non-public information collection unit 101b stores acquired various types of information in the information storing unit 102 (the information database 102a), which will be described later. The non-public information collection unit 101b may provide the information storing unit 102 with, as threat information, information including a search word stored in the dictionary database 102b, which will be described later, out of the acquired various types of information. On this occasion, the non-public information collection unit 101b may store each piece of acquired various types of information in conjunction with a piece of information capable of specifying an information source and a piece of information indicating a time relating to the piece of various types of information acquired from the information source in the information database 102a. The piece of information indicating a time relating to a piece of various types of information may, for example, represent a time at which the piece of various types of information is acquired, a time at which the piece of various types of information is created, or a time at which the piece of various types of information is made public.

The information storing unit 102, using a physical or virtual storage device and the like, stores (stores) various types of information (hereinafter, referred to as "reference information") that the information collection unit 101 acquired from information sources. The information storing unit 102 may, for example, be configured using a well-known file system, various types of databases, or the like. When the information storing unit 102 is configured using a file system, each piece of reference information that the information storing unit 102 stores is a file. When the information storing unit 102 is configured using one of various types of databases, each piece of reference information that the information storing unit 102 stores is a record stored in the database.

The information storing unit 102 includes the information database 102a and the dictionary database 102b. Note that the information database 102a and the dictionary database 102b are not limited to the form of a specific database and may be configured using, for example, files and the like.

The information database 102a stores reference information provided by the above-described public information collection unit 101a and non-public information collection unit 101b. The information database 102a may store each piece of reference information, an information source of the piece of reference information, and a time at which the piece of reference information was acquired in association with one another.

The information database 102a may store, for example, a piece of information indicating the type of an information source, a piece of information capable of specifying the information source, a piece of information indicating a time (a date and time) relating to each piece of reference information, the content of the piece of reference information, and the like in association with one another. The piece of information capable of specifying each information source may be, for example, a piece of information capable of specifying an address in a communication network (for example, an internet protocol (IP) address), a uniform resource locator (URL), or a sender of a social media message, and the like. The information database 102a may further store information other than the above-described information. The information database 102a may store a result of analysis by the information analysis unit 104, which will be described later, in addition to the above-described information.

The dictionary database 102b stores one or more search words (hereinafter, sometimes referred to as "first phrase information") each of which is a phrase related to security. The search words stored in the dictionary database 102b may include a wide variety of phrases including, for example, not only security terms but also other phrases related to security terms (for example, various types of technical terms and the names of products or applications) and the like.

Figure 3:
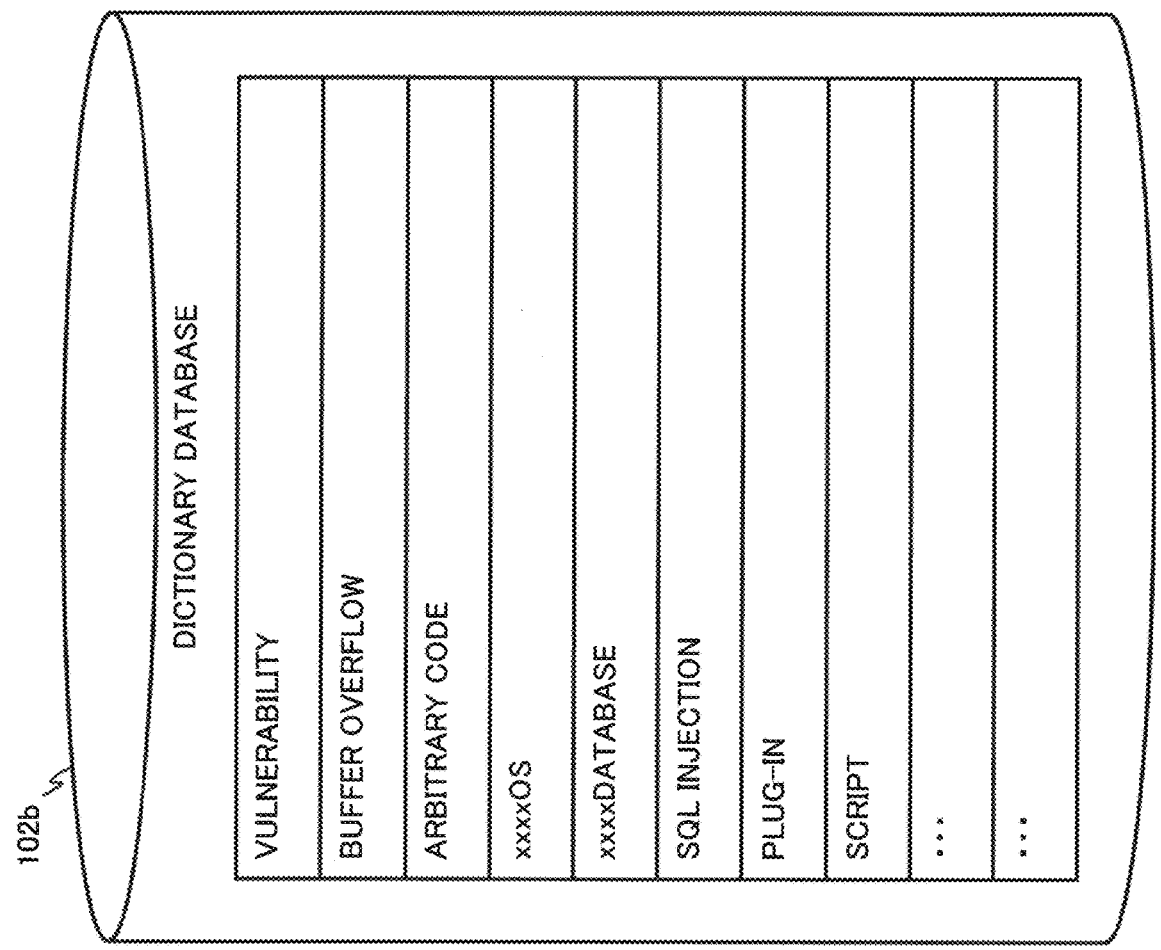
FIG. 3 is an explanatory diagram illustrating a specific example of information stored in a dictionary database in the first example embodiment of the present invention.

Into the dictionary database 102b, a phrase that is extracted from reference information by the information aggregation unit 103, which will be described later, is newly stored as a search word. In addition, in the dictionary database 102b, one or more search words may be stored in advance by users and the like of the information analysis system 100 (for example, FIG. 3).

The information aggregation unit 103 analyzes one or more pieces of reference information stored in the information database 102a and extracts a piece(s) of reference information including any search word stored in the dictionary database 102b. Specifically, the information aggregation unit 103 analyzes each piece of reference information and decomposes the piece of reference information (text data included in the piece of reference information) into words according to parts of speech. When a piece of reference information is text data, the information aggregation unit 103 may decompose the text data into words by, for example, performing morphological analysis on the text data. When a piece of reference information is non-text data, such as an image, a video, and a voice, the information aggregation unit 103 may, for example, extract a string of letters included in the non-text data and perform morphological analysis on the extracted string of letters. In this case, the information aggregation unit 103 may extract a string of letters included in the non-text data as metadata (for example, a caption, a subtitle, and the like). The information aggregation unit 103 may also extract a string of letters included in the non-text data by performing various types of processing (image recognition, voice recognition, binary analysis, and the like) on the non-text data. For a specific method for extracting a string of letters from non-text data, any well-known technology is employable. The information aggregation unit 103 may, for example, store an analysis result of each piece of reference information in the information database 102a.

The information aggregation unit 103 may, for example, confirm whether or not a search word stored in the dictionary database 102b is included in a set of words that are extracted from each piece of reference information and into which the piece of reference information is decomposed according to parts of speech. The confirmation enables the information aggregation unit 103 to specify (extract) a piece(s) of reference information that includes a search word stored in the dictionary database 102b.

The information aggregation unit 103 extracts (an)other word(s) (hereinafter, sometimes referred to as a "related word(s)") that is/are related to a search word and that is/are included in an extracted piece(s) of reference information including the search word. In the following description, a piece of information representing a related word is sometimes referred to as "second phrase information".

Hereinafter, extraction processing of a related word(s) performed by the information aggregation unit 103 will be described. First, the information aggregation unit 103, with respect to a search word (assumed to be referred to as a search word "X"), extracts (an)other word(s) (hereinafter, referred to as a "related word candidate(s)") that is/are included in a piece(s) of reference information including the search word "X". On this occasion, the information aggregation unit 103 may eliminate a word(s) that is/are not extracted as a related word candidate out of the other words included in the piece(s) of reference information, based on a predetermined rule.

The information aggregation unit 103, for example, using statistic(s) on a related word candidate(s) included in the same piece of reference information as that including a search word "X", extracts a related word(s) having a relationship with the search word "X" out of the related word candidate(s). The information aggregation unit 103 may, as a statistic on each related word candidate, use, for example, the number of appearances of the related word candidate. In this case, the information aggregation unit 103 counts the number of appearances of each related word candidate included in the same piece of reference information as that including the search word "X". On this occasion, the information aggregation unit 103 may, with respect to a plurality of pieces of reference information including the search word "X", count the number of appearances of each related word candidate included in the pieces of reference information.

The information aggregation unit 103 generates a ranking of the number of appearances of each related word candidate included in the same piece of reference information as that including the search word "X" from a result of the count. The information aggregation unit 103 extracts, for example, a related word candidate(s) ranked at the top to a predetermined position in the ranking as a related word(s) having a relationship with the search word "X". Note that the predetermined position in the ranking may, for example, be appropriately set as a configuration parameter. When the predetermined position in the ranking is set so that the number of words extracted as related words increases, the information aggregation unit 103 may extract, as related words, a wide variety of words related to security information represented by a search word. On the other hand, when, for example, the predetermined position in the ranking is set so that the number of words extracted as related words decreases, the information aggregation unit 103 may limit related words to be extracted to words having a strong relationship with a search word.

A description will be made using a specific example illustrated in FIG. 4. It is assumed that, in the specific example in FIG. 4, pieces of reference information "S1" and "S2" acquired by the public information collection unit 101a are stored in the information database 102a and both pieces of reference information include a search word "X". It is also assumed that each piece of reference information includes any one(s) of words "A", "B", "C", and "D" in addition to "X". In this case, the information aggregation unit 103, for example, extracts the words "A", "B", "C", and "D" included in the pieces of reference information including the search word "X", counts the number of appearances of each of the words, and generates a ranking. The information aggregation unit 103 extracts, for example, words ranked at the top to the third in the ranking (in this case, "A", "B", and "C") as related words.

Note that the method by which the information aggregation unit 103 extracts a related word(s) is not limited to the above-described method. For example, the information aggregation unit 103 may extract a related word candidate(s) the number(s) of appearances of which is/are equal to or more than a criterion value as a related word(s). The information aggregation unit 103 may also, for example, calculate an appearance probability(ies) of a related word candidate(s) in pieces of reference information including a search word "X" and, based on the appearance probability(ies), extract a related word(s). The information aggregation unit 103 may also, for example, calculate a correlation coefficient(s) between a search word and a related word candidate(s) included in one or more pieces of reference information and, based on the correlation coefficient(s), extract a related word(s).

The information aggregation unit 103 adds an extracted related word(s) to the dictionary database 102b. The addition causes not only search words stored in advance but also a related word(s) included in a piece(s) of reference information acquired from various types of information sources to be stored in the dictionary database 102b. That is, into the dictionary database 102b, a related word(s) that is/are extracted by the information aggregation unit 103 is/are stored as a new search word(s).

The storing, for example, causes, in the information analysis system 100, a security term(s) or a word(s) related to the security term(s) to be stored in the dictionary database 102b without users adding a search word explicitly. That is, the information analysis system 100 may expand data used for detecting threat information without depending on knowledge levels and the like of users of the information analysis system 100. Note that, in the following description, search words and a related word(s) newly stored as a search word(s) are sometimes collectively referred to as simply search words.

The information analysis unit 104 analyzes a time-series appearance tendency (hereinafter, referred to as a "trend" or an "appearance trend") of each of search words (including related words) stored in the dictionary database 102b and extracts a search word(s) the appearance tendency(ies) of which has/have changed. The information analysis unit 104 may, for example, provide the information output unit 106, which will be described later, with the extracted search word(s). In addition, the information analysis unit 104 outputs a piece(s) of reference information including a specific search word accepted from the search information input unit 105, which will be described later. On this occasion, the information analysis unit 104 may provide the information output unit 106 and the threat information output unit 107 with the specified search word and a piece(s) of reference information including the specified search word. Hereinafter, a specific configuration of the information analysis unit 104 will be described.

The information analysis unit 104 includes a trend detection unit 104a and a search unit 104b. The trend detection unit 104a, based on search words (including related words) stored in the dictionary database 102b and pieces of reference information stored in the information database 102a, analyzes an appearance trend of each search word included in the respective pieces of reference information. Hereinafter, analysis processing of such an appearance trend will be described.

The trend detection unit 104a, using technical analysis methods used in the financial engineering field and the like, calculates data indicating a time-series appearance trend of a search word and, based on the calculated data, determines an appearance trend of the search word.

The trend detection unit 104a may determine an appearance trend of a search word using, for example, a moving average convergence divergence (MACD) method out of such technical analysis methods. The MACD method is a method that is, in general, used when a time-series trend of a stock price is determined. Hereinafter, an index calculated in the MACD method is sometimes referred to as simply a MACD. The trend detection unit 104a of the present example embodiment determines an appearance trend of a search word by using a time series of the number of appearances of the search word in place of a stock price. The trend detection unit 104a, for example, calculates MACDs at a plurality of (for example, two) timings with respect to a search word and, based on a relationship between the calculated pieces of data, determines an appearance trend of the search word. Hereinafter, a method for determining an appearance trend of a search word by use of MACDs will be described.

A MACD is calculated based on a difference between exponential moving averages of the numbers of appearances of a search word in two different periods of time. The trend detection unit 104a may calculate an exponential moving average (EMA) relating to the number of appearances of a search word at a timing (T), based on, for example, an equation below.

$$EMA(T) = P(T)\left(\frac{2}{n+1}\right) + EMA(T-1)\left(1 - \frac{2}{n+1}\right) \quad (1)$$

EMA(T) in the equation (1) denotes an EMA of a search word (assumed to be denoted by "SW") at a timing (T). In addition, EMA(T−1) denotes an EMA of the search word SW at a timing (T−1), which is a timing immediately before the timing (T). Such timings are specified in appropriate units of time, such as units of day like "a day" and units of hour like "an hour". Note that, when a general EMA relating to a stock price is calculated, EMA(T) and EMA(T−1) often represent an EMA at a specific day (T) and an EMA at the previous day of the specific day, respectively. In the present example embodiment, EMA(T) and EMA(T−1) may, for example, represent an EMA at a specific time and an EMA at a time an hour before the specific time, respectively.

P(T) in the equation (1) denotes the number of appearances of the search word SW at a timing (T). More specifically, P(T) represents, for example, the number of search words that have appeared in a period from the timing (T−1) to the timing (T). Note that, when a general EMA relating to a stock price is calculated, P(T) often represents a closing price of the stock price of an issue in a specific day.

In the equation (1), n denotes a period of time (for example, "n days" or "n hours") over which a moving average is calculated.

The trend detection unit 104a, for example, with respect to a piece(s) of reference information the appearance date and time (or creation date and time or acquisition date and time) of each of which is included in a period from a timing (t−1) to a timing (t), calculates the number P(t) of appearances of each search word stored in the dictionary database 102b. The trend detection unit 104a may calculate EMA(T) by calculating P(t) and EMA(t) with respect to respective timings t=1 to T−1 by use of the equation (1).

Next, the trend detection unit 104a calculates a MACD using the equation below.

$$MACD(T) = EMA_{short}(T) - EMA_{long}(T) \quad (2)$$

In the above equation (2), $EMA_{short}$, for example, denotes an EMA over a short period of time. In addition, $EMA_{long}$ denotes an EMA over a long period of time. For example, in the case of a well-known MACD relating to a stock price, an EMA of the stock price over 12 days (n=12 days) and an EMA of the stock price over 26 days (n=26 days) are often used as $EMA_{short}$ and $EMA_{long}$, respectively. The period of time of $EMA_{short}$ or $EMA_{long}$ in the present example embodiment may be appropriately set by users and the like of the information analysis system 100. Note that these periods of time may, for example, be adjusted based on a prior experiment and the like or appropriately adjusted based on a result of detection by the trend detection unit 104a. For example, the trend detection unit 104a may use an EMA of the number of appearances of a search word over 12 hours (n=12 hours) as $EMA_{short}$. In addition, the trend detection unit 104a may use an EMA of the number of appearances of the search word over 24 hours (n=24 hours) as $EMA_{long}$.

The trend detection unit 104a further calculates a MACD signal. A MACD signal is calculated as an exponential moving average (EMA) of MACDs over a period of time. Alternatively, a MACD signal may be calculated as a simple average of MACDs over a period of time.

The trend detection unit 104a may, for example, calculate a MACD signal (SIGNAL(T)) using an equation below.

$$SIGNAL(T) = MACD(T)\left(\frac{2}{n+1}\right) + SIGNAL(T-1)\left(1 - \frac{2}{n+1}\right) \quad (3)$$

The trend detection unit 104a calculates a MACD histogram using a MACD and a MACD signal calculated as described above. The trend detection unit 104a calculates a MACD histogram (HISTOGRAM(T)) using the formula below.

$$HISTOGRAM(T) = MACD(T) - SIGNAL(T) \quad (4)$$

The trend detection unit 104a calculates MACD histograms at two different timings using the above-described respective formulae and, in conjunction therewith, calculates the product of the calculated MACD histograms. More specifically, the trend detection unit 104a, for example, calculates the product of MACD histograms at two adjacent timings.

Based on a result of the above-described product calculation, the trend detection unit 104a, for example, determines whether or not the appearance trend of a search word has changed (switched). When the above-described product calculation resulted in a positive value, the trend detection unit 104a determines that the appearance trend of the search word has not switched. On the other hand, when the above-described product calculation resulted in a negative value, the trend detection unit 104a determines that the appearance trend of the search word has switched. In other words, the trend detection unit 104a determines a trend of a search word, based on a relationship between a value in a time series of MACD signals and criterion data (in this case, a criterion value "0"). When "0" is considered to be a criterion value (criterion data), the trend detection unit 104a determines that the trend of a search word has switched when the MACD signal value has changed from a value equal to or more than the criterion value "0" to a value less than the criterion value "0". In addition, the trend detection unit 104a also determines that the trend of the search word has switched when the MACD signal value has changed from a value less than the criterion value "0" to a value equal to or more than the criterion value "0".

Note that, when transitions in time series of MACDs and MACD signals as described above are illustrated in graphs, the trend of the search word is determined to have switched at an intersection point between the graph representing the MACDs and the graph representing the MACD signals.

For example, a case is assumed where a MACD histogram at the timing (T−1) and a MACD histogram at the timing (T) have a negative value and a positive value, respectively. In this case, the trend detection unit 104a determines that the number of appearances of the search word has switched to an increasing trend. Such a switch of trends may be considered to indicate signs of, for example, some security event related to the search word occurring (or expanding). For example, when the number of appearances of a search word relating to some vulnerability or attack method has switched to an increasing trend, such a switch of trends may be considered to indicate signs of an occurrence or expansion of an attack method for attacking the vulnerability.

In addition, for example, a case is assumed where a MACD histogram at the timing (T−1) and a MACD histogram at the timing (T) have a positive value and a negative value, respectively. In this case, the trend detection unit 104*a* determines that the number of appearances of the search word has switched to a decreasing trend. Such a switch of trends may be considered to indicate signs that some security event related to the search word tends to subside. For example, when the number of appearances of a search word relating to some vulnerability or attack method has switched to a decreasing trend, such a switch of trends may be considered to indicate a sign that attacks on the vulnerability tends to subside.

When, for example, a threat, such as a cyberattack, has occurred, it is desirable that a person in charge on the defense side be capable of detecting the threat early. In addition, it is also desirable that the person in charge on the defense side be capable of determining that the threat has subsided at the right time. This is because a countermeasure (for example, communication shut-off and service halt) against a cyberattack that affects the availability of a system is sometimes taken and, in this case, it is desirable that such a countermeasure be finished at a proper timing. The processing by the trend detection unit 104*a* as described above enables users of the information analysis system 100 to, based on an increasing trend of a search word, detect an occurrence of a threat related to the search word at the right time. The processing by the trend detection unit 104*a* as described above also enables users of the information analysis system 100 to, based on a decreasing trend of a search word, detect subsidence of a threat related to the search word at the right time.

Note that, without being limited to the above method, the trend detection unit 104*a* may determine that the appearance tendency of a search word has switched, for example, at a timing at which calculation results of MACDs have changed from a value equal to or more than a criterion value (for example, "0") to a value less than the criterion value. Similarly, the trend detection unit 104*a* may determine that the appearance tendency of a search word has switched at a timing at which calculation results of MACDs have changed from a value less than a criterion value (for example, "0") to a value equal to or more than the criterion value.

In addition, the trend detection unit 104*a* may determine whether or not the appearance tendency of a search word has switched based on, for example, a result of comparison of MACDs (or MACD signals) at different timings with each other. Specifically, the trend detection unit 104*a* may, for example, compare magnitude relations between respective MACDs (or MACD signals) calculated in time series and determine that the appearance tendency of the search word has switched at a timing at which relations between MACD values (or MACD signal values) have changed from a decrease to an increase. Similarly, the trend detection unit 104*a* may determine that the appearance tendency of the search word has switched at a timing at which relations between MACD values (or MACD signal values) have changed from an increase to a decrease.

Further, the trend detection unit 104*a* may determine a trend of a search word using a method other than the MACD method out of the technical analysis methods. For example, the trend detection unit 104*a* may determine a trend of a search word using historical volatility (HV). In this case, the trend detection unit 104*a* may calculate HV values over a plurality of (for example, two) periods of time with respect to a search word and, based on a relationship between the calculated pieces of data, determine an appearance trend of the search word.

When using the HV, the trend detection unit 104*a* calculates a standard deviation of the rate of change in the number of appearances of the search word over a period of time in the past. The trend detection unit 104*a* may obtain a rate of change by calculating a ratio between the numbers of appearances of the search word at two different timings (for example, a timing (T) and a timing (T−1)).

The trend detection unit 104*a* obtains an HV value at a timing (T) by calculating a standard deviation of rates of change at timings from the timing (T) to the (T−n)th point of time in the past. A large HV value and a small HV value indicate a large change and a small change in the number of appearances of the search word, respectively.

The trend detection unit 104*a*, for example, calculates an $HV_{long}$ value over a relatively long period of time (for example, n=24 hours) and an $HV_{short}$ value over a relatively short period of time (for example, n=12 hours) and, based on a relationship therebetween, determines an appearance trend of the search word. Specifically, the trend detection unit 104*a* may determine that the trend of the search word has switched at an intersection point between a graph in which $HV_{long}$ values calculated at respective timings are plotted and a graph in which $HV_{short}$ values calculated at the respective timings are plotted. That is, the trend detection unit 104*a* calculates two different types of data ($HV_{long}$ and $HV_{short}$) representing an appearance tendency of a search word and, based on a result of comparison therebetween, determines whether or not the appearance tendency of the search word has switched.

In addition, the trend detection unit 104*a* may, by comparing a rate of change in the number of appearances of a search word with an HV value at a timing, determine how large the rate of change in the number of appearances of the search word at the timing has changed. The trend detection unit 104*a* may determine that the appearance trend of the search word has switched when, for example, the ratio between a rate of change in the number of appearances of the search word and an HV value at a timing has exceeded a predetermined criterion value.

Without being limited to the above method, the trend detection unit 104*a* may determine a trend of a search word using another technical analysis method. The trend detection unit 104*a* may employ, for example, a method using a relative strength index (RSI), a method using a moving average deviation rate, a method using a volume ratio (VR), and the like. While, in general, being often used for analysis of a stock price and the like, these methods may detect a switch of the appearance trend of a search word by using the number of appearances of the search word in place of a stock price.

Hereinafter, a search word the trend of which is determined to have switched is sometimes referred to as a "trend-switched word". The trend detection unit 104*a* provides the information output unit 106, which will be described later, with a trend-switched word(s). Note that the trend detection unit 104*a* may provide the information output unit 106 with a result (an appearance trend) of the technical analysis relating to each search word.

The search unit 104b searches the information database 102a for and extracts a piece(s) of reference information including a specific search word specified through the search information input unit 105, which will be described later. The search unit 104b provides the information output unit 106 with the extracted piece(s) of reference information. The search unit 104b may provide the threat information output unit 107 with the specified search word and the extracted piece(s) of reference information.

The search information input unit 105 accepts an input specifying a specific search word (a specified search word). For example, the search information input unit 105 may accept, as an input, a piece of information indicating a search word specified by a user of the information analysis system 100 out of search words presented by the information output unit 106. The search information input unit 105 may accept an input specifying a specified search word, for example, via a user interface screen (will be described later) presented by the information output unit 106. The search information input unit 105 may accept a string of letters representing a search word specified by a user or accept a piece of identification information capable of identifying a search word specified by the user. The search information input unit 105 provides the search unit 104b with the specified search word (or the piece of information capable of specifying the specified search word).

The information output unit 106 displays a trend-switched word(s) provided by the trend detection unit 104a using an appropriate display method. The information output unit 106 may, for example, refer to the dictionary database 102b and display a search word(s) other than the trend-switched word(s). The information output unit 106 also displays a piece(s) of reference information relating to the specified search word and that is/are provided by the search unit 104b.

The information output unit 106 may, for example, generate a user interface screen (specifically, screen data) that can be displayed on at least a portion of a screen of one of various types of display devices (for example, various types of liquid crystal monitors, a projector, a touch panel, and another type of device having a display function). Note that the display device may be included in the information output unit 106 or connected to the information analysis system 100.

The user interface screen generated by the information output unit 106 includes at least an area for displaying a trend-switched word(s). The information output unit 106 may display a trend-switched word(s) and a search word(s) that is/are not a trend-switched word(s) in a form enabling each thereof to be identified on the user interface screen.

Figure 5:
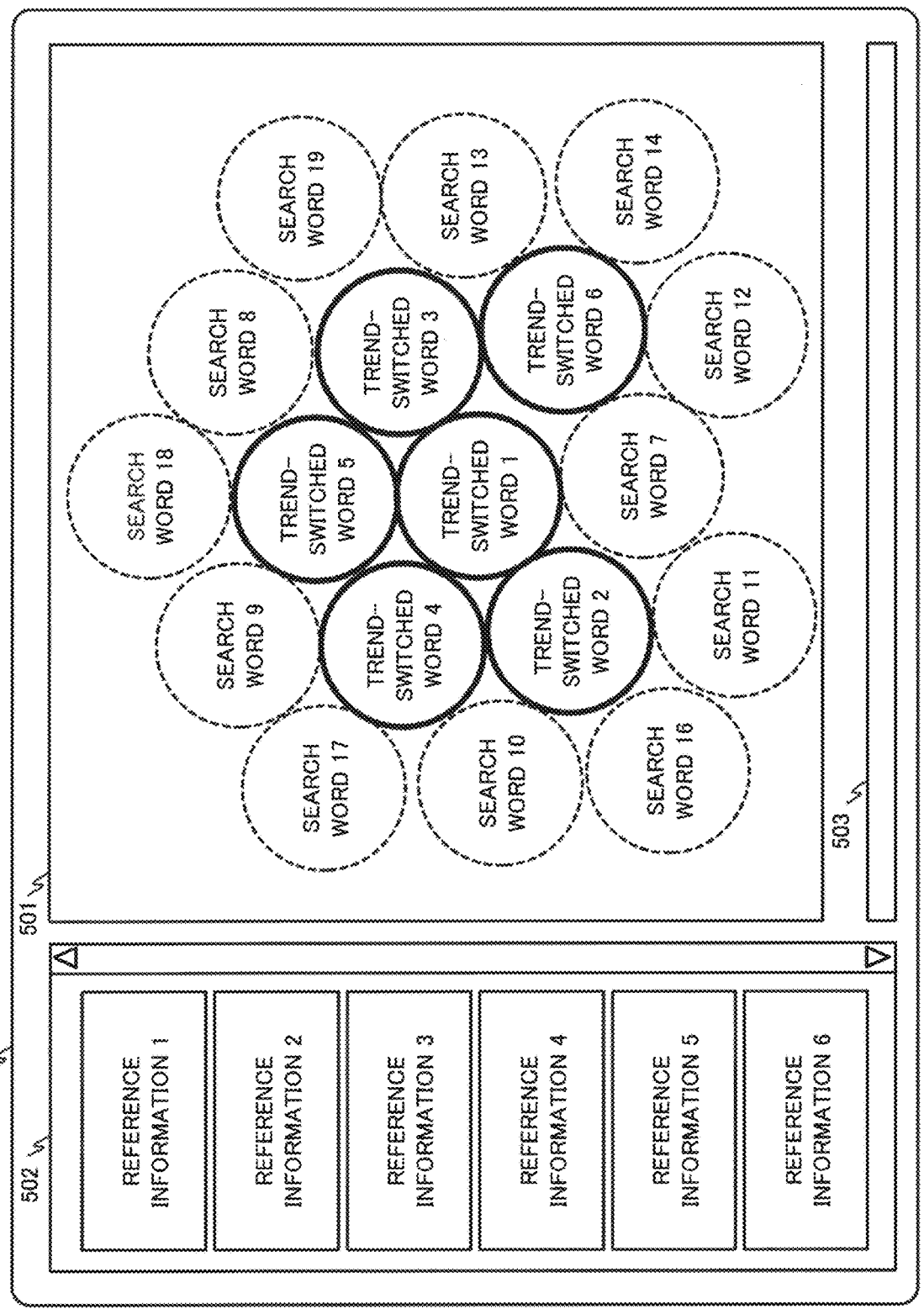
FIG. 5 is an explanatory diagram illustrating a specific example of a user interface generated by the information analysis system in the first example embodiment of the present invention.
Figure 6:
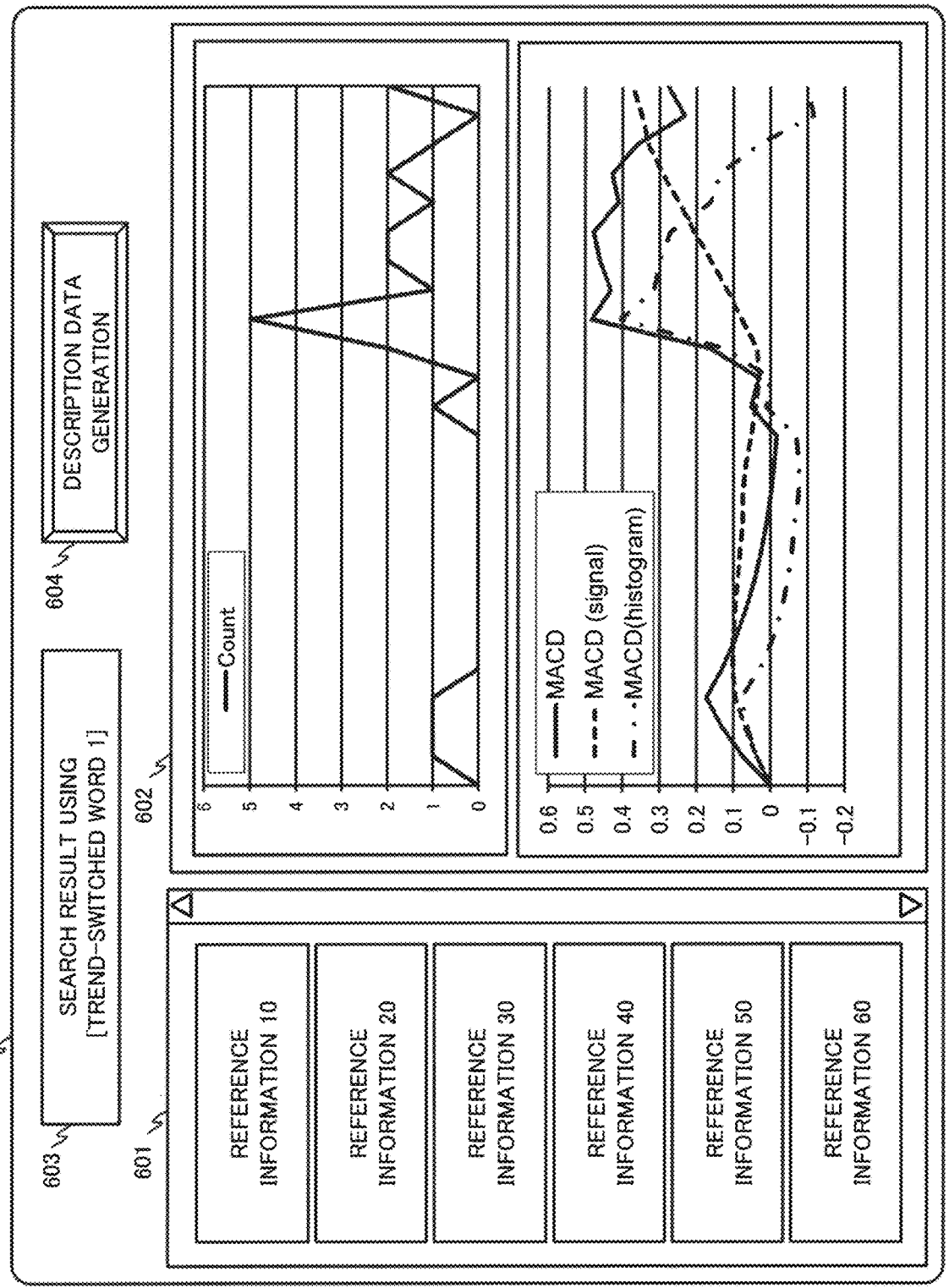
FIG. 6 is an explanatory diagram illustrating another specific example of the user interface generated by the information analysis system in the first example embodiment of the present invention.
Figure 7:
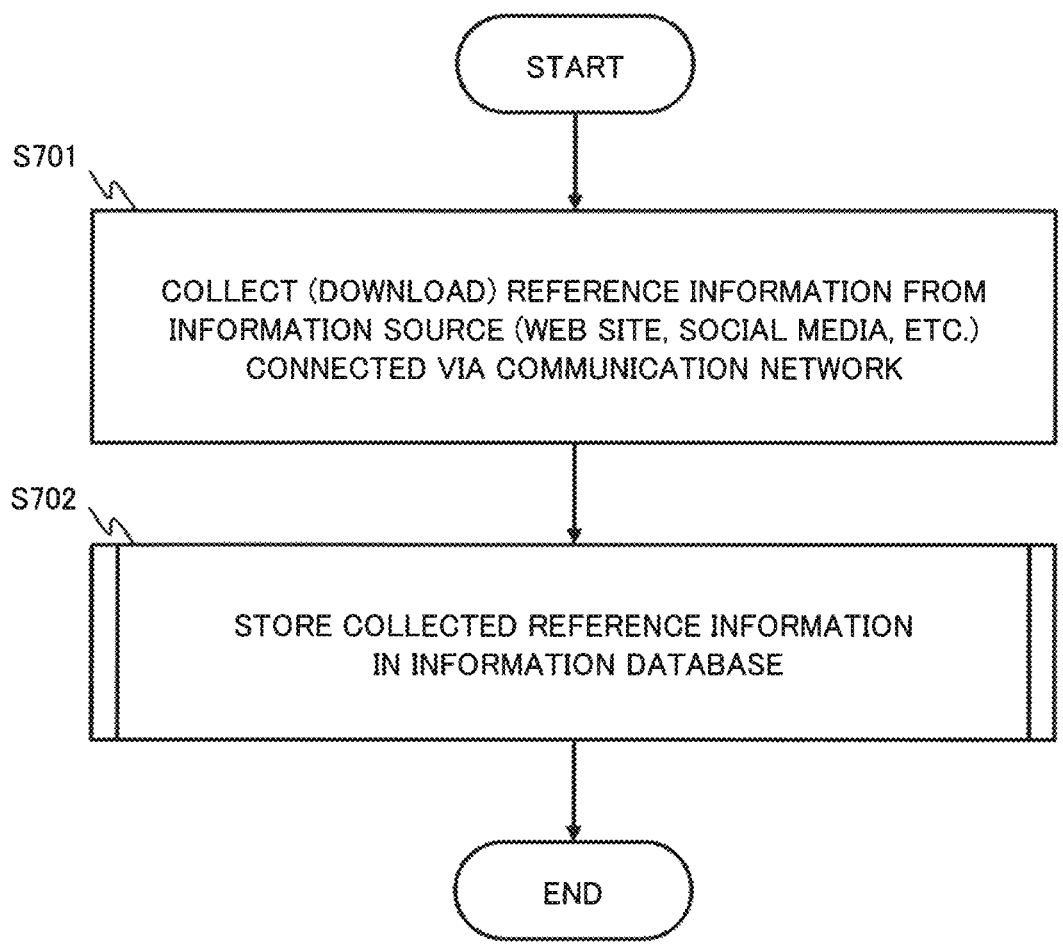
FIG. 7 is a flowchart (1/5) exemplifying an operation of the information analysis system in the first example embodiment of the present invention.
Figure 8:
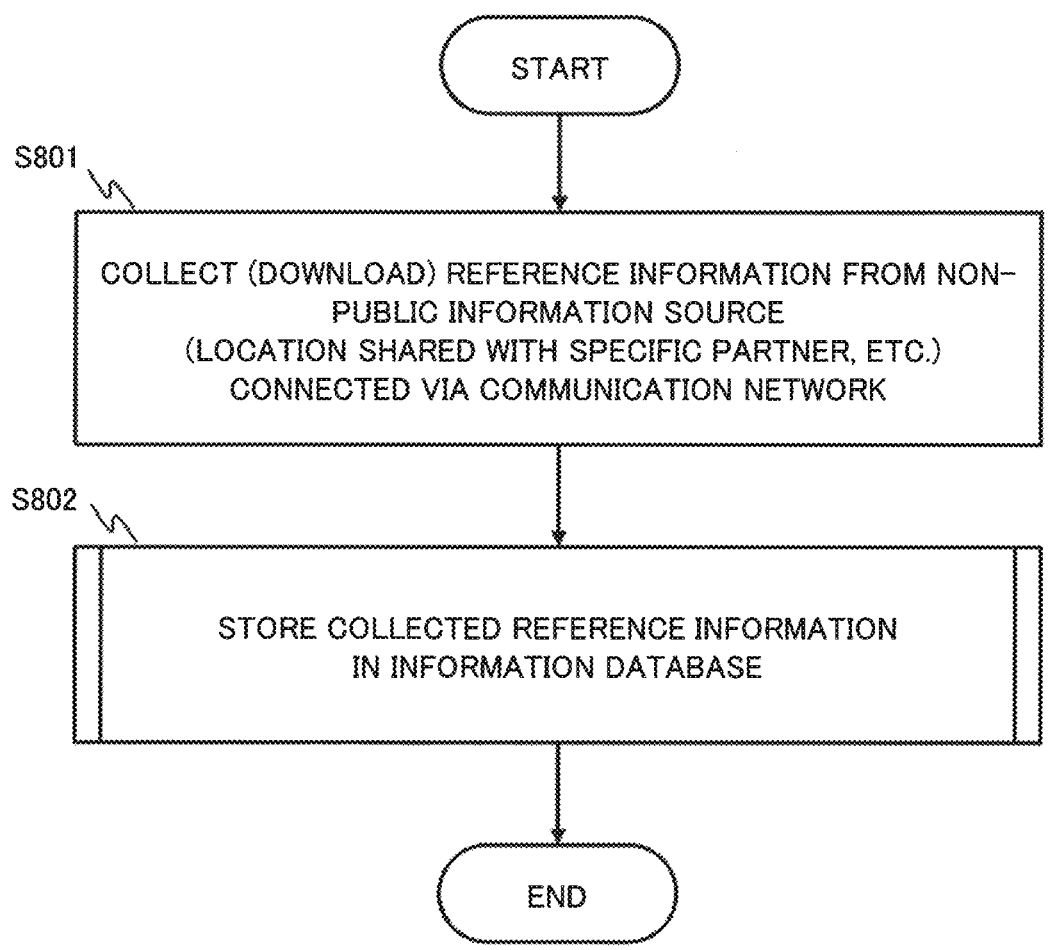
FIG. 8 is a flowchart (2/5) exemplifying an operation of the information analysis system in the first example embodiment of the present invention.
Figure 9:
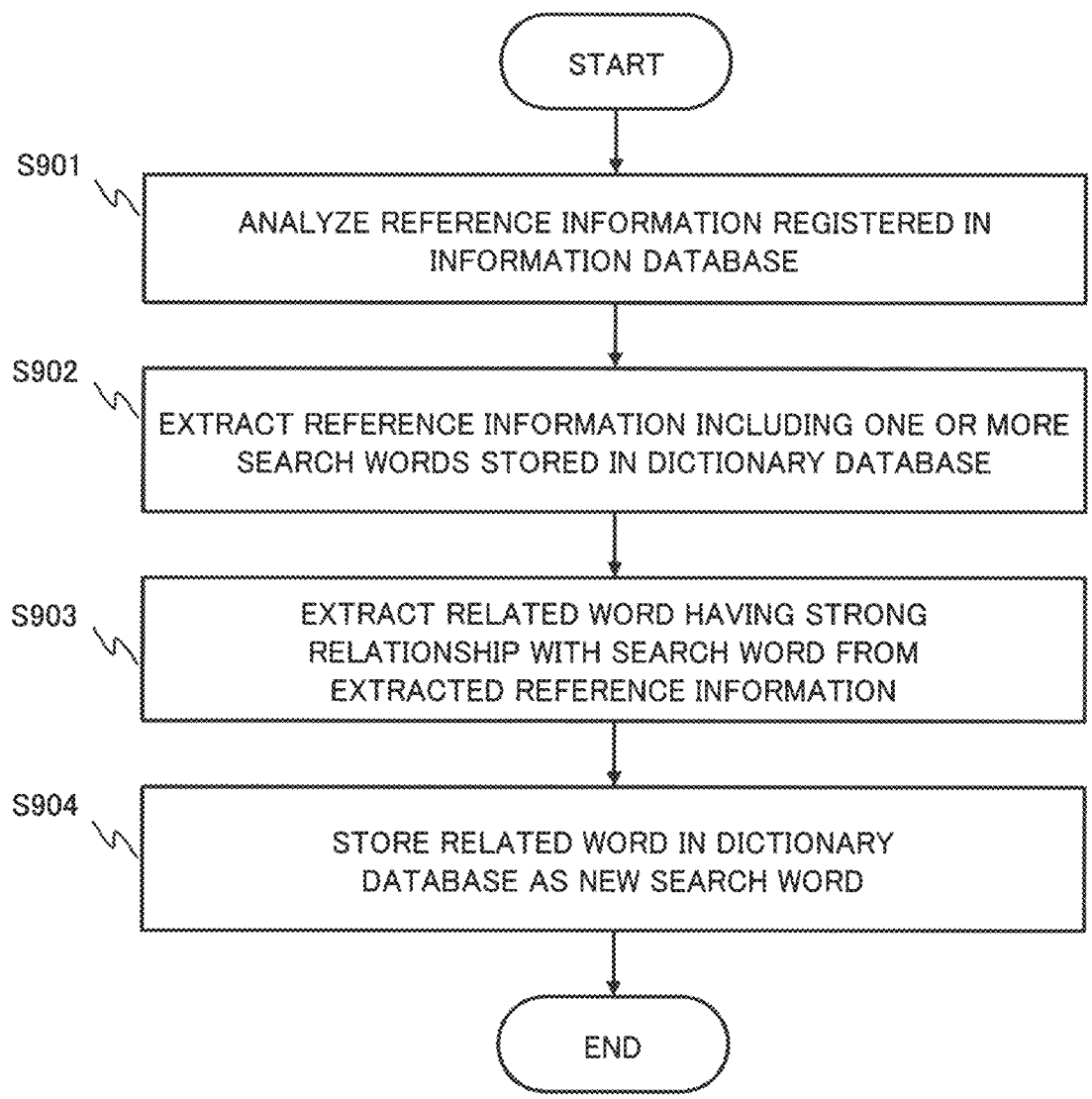
FIG. 9 is a flowchart (3/5) exemplifying an operation of the information analysis system in the first example embodiment of the present invention.
Figure 10:
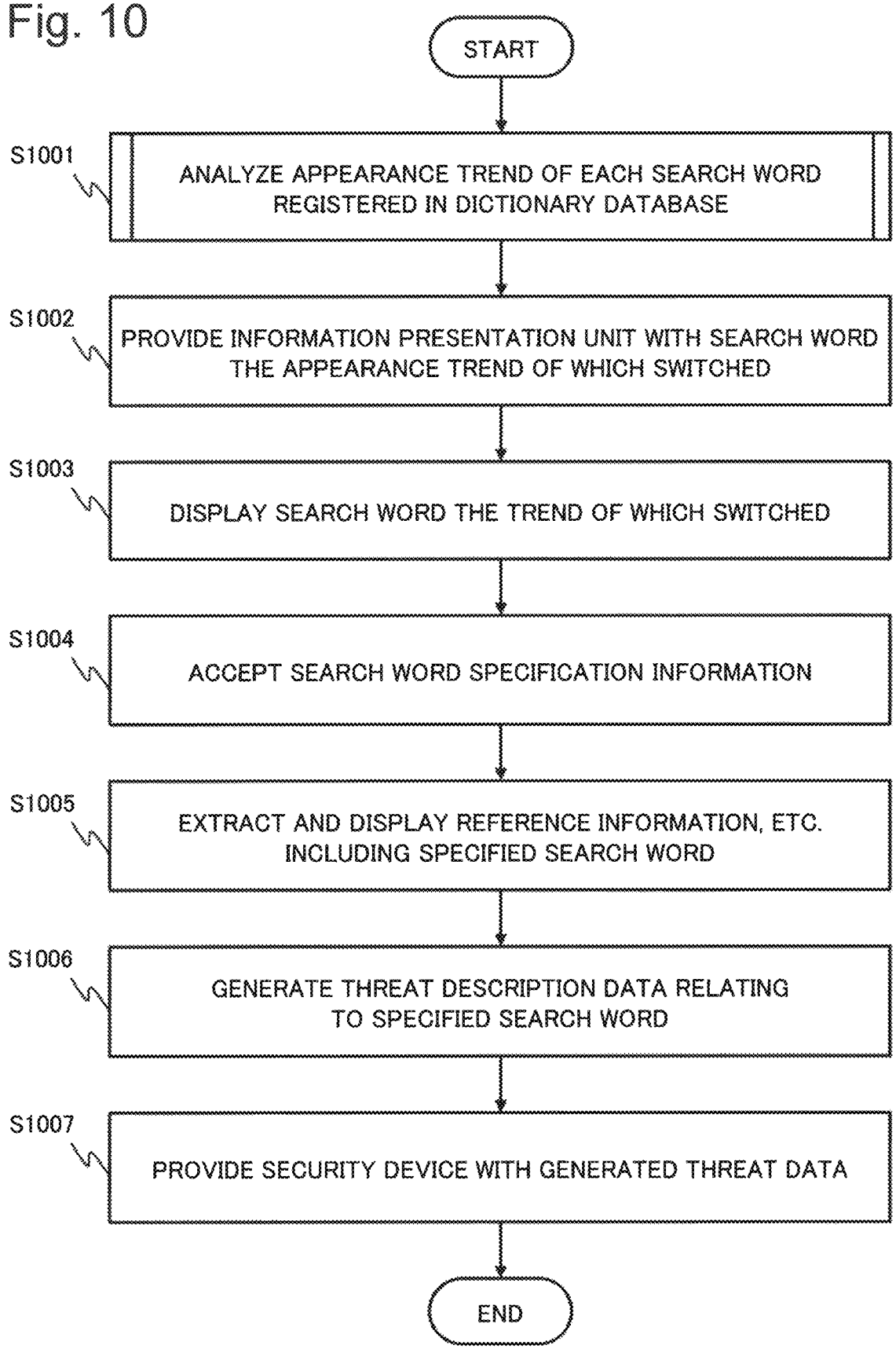
FIG. 10 is a flowchart (4/5) exemplifying an operation of the information analysis system in the first example embodiment of the present invention.

FIGS. 5 and 6 are explanatory diagrams illustrating examples of user interface screens generated by the information output unit 106. A user interface screen 500 exemplified in FIG. 5 includes an area (a display area 501, sometimes referred to as a "first display area") in which a search word(s) can be displayed. The user interface screen 500 may include an area (a display area 502) for displaying a piece(s) of reference information. The user interface screen 500 may include an input area 503 into which a search word can be input.

In the display area 501, at least a trend-switched word(s) provided by the trend detection unit 104a is/are displayed. In the display area 501, (an)other search word(s) other than a trend-switched word(s) may be displayed. In the specific example illustrated in FIG. 5, drawing elements (circular shapes) representing trend-switched words (trend-switched words 1 to 6) are drawn with solid lines and drawing elements representing other search words (for example, a search word 7 and the like) are drawn with dashed lines. Without being limited to the above method, the information output unit 106 may, for example, draw drawing elements representing trend-switched words and other search words using different sizes and shapes or using different color combinations. The information output unit 106 may also draw identification signs (or identification images, such as icons) capable of identifying respective trend-switched words and search words. When a user of the information analysis system 100 selects (for example, clicks or touches on the screen) a search word displayed in the display area 501, a piece of information specifying the selected search word may be provided to the search information input unit 105.

In the display area 502, for example, a piece(s) of reference information stored in the information database 102a is/are displayed. Such a piece(s) of reference information may, for example, be a piece(s) of reference information including one of a trend-switched word(s) or one of (an) other search word(s) displayed in the display area 501.

The input area 503 is an area to which users of the information analysis system 100 are able to input a search word directly. Users of the information analysis system 100 may, for example, input a search word to the input area 503 using an appropriate input method (for example, a keyboard, voice recognition, and the like). The search word input to the input area 503 may be provided to the search information input unit 105.

The information output unit 106 may also generate a user interface screen that is capable of displaying a piece(s) of reference information that is/are related to a specified search word and that is/are extracted by the search unit 104b. A user interface screen 600 exemplified in FIG. 6 includes an area (a display area 601, sometimes referred to as a "second display area") for displaying a piece(s) of reference information relating to a specified search word. The user interface screen 600 also includes an area (a display area 602, sometimes referred to as a "third display area") for displaying a result of technical analysis relating to the specified search word. Note that the user interface screen 600 may include an area (a display area 603) for displaying the specified search word. Further, the user interface screen 600 may include an operation area (an operation area 604).

In the display area 601, a piece(s) of reference information related to a specified search word is/are displayed. Such a piece(s) of reference information is/are, for example, a Web page, SNS data, and the like that include the specified search word. Note that, in the display area 601, a piece(s) of reference information itself/themselves may be displayed or a link(s) to the piece(s) of reference information may be displayed. Alternatively, in the display area 601, a portion of each of a piece(s) of reference information may be displayed, and, when a user of the information analysis system 100 selects (for example, clicks, touches on the screen, or the like) a piece of reference information, the whole of the piece of reference information may be displayed.

In the display area 602, for example, a result of technical analysis that relates to a specified search word and that is acquired from the trend detection unit 104a may be displayed in a form of graph and the like (for example, a graph representing a trend relating to the specified search word, a graph representing the numbers of appearances of the specified search word, and the like). Note that, in a graph representing a trend, a timing at which the trend switched (a trend switching point) may be displayed in a highlighted manner. This display enables users of the information analysis system 100 to easily grasp a timing at which the trend switched.

The information output unit 106 as described above enables users of the information analysis system 100 to confirm a search word the appearance trend of which switched (a trend-switched word), a piece(s) of reference information related to the trend-switched word, and a result of technical analysis relating to the trend-switched word in association with one another. For example, a case is assumed where a search word (a trend-switched word) is a word relating to a vulnerability. In this case, users of the information analysis system may confirm the transition (whether an increase or decrease) of the number of appearances of information relating to the vulnerability using a result of technical analysis relating to the search word. The users of the information analysis system 100 may obtain information relating to a vulnerability related to the search word and an attack method on the vulnerability by confirming a piece(s) of reference information including the search word.

The operation area 604 is, for example, configured with user interface components, such as a push button, a clickable icon, and a menu. For example, when a user of the information analysis system 100 operates the operation area 604, the threat information output unit 107, which will be described later, may generate data (will be described later) describing a threat related to a specified search word.

The threat information output unit 107, based on a piece(s) of reference information that include(s) a specified search word and that is/are provided by the information analysis unit 104 (the search unit 104b), generates data (threat description data) describing a threat related to the specified search word and a countermeasure against the threat. On this occasion, the threat information output unit 107 generates the threat description data using a standardized structured threat information form. Specifically, the threat information output unit 107 generates threat description data using, for example, a standard form, such as a structured threat information expression (STIX), a cyber observable expression (CybOX), and an open indicator of compromise (OpenIOC). Note that, since these standard forms are well-known technologies, a specific description thereof will be omitted.

The threat information output unit 107, for example, extracts data conforming to a predetermined form from a piece(s) of reference information provided from the search unit 104b. The data conforming to a predetermined form are, for example, data capable of specifying some resource or object and are described in accordance with a predetermined format. Specifically, such data may, for example, be an address (for example, an IP address) in a communication network, a URL, a file name, a hash value of a file, a domain name, and the like.

URLs that the threat information output unit 107 extracts may include, for example, the URL of an attacking site prepared by an attacker, the URL of a site to be attacked, a URL included in malware, a URL describing an attack method, and the like.

Address information that the threat information output unit 107 extracts may include, for example, the address of an attacking site prepared by an attacker, a connection destination address to which malware connects, the address of a site providing malware, and the like.

In addition, information that is capable of specifying a file and that is extracted by the threat information output unit 107 may include, for example, a file name, a hash value of a file, and the like.

The threat information output unit 107 generates threat description data using extracted information. For example, the threat information output unit 107 may generate threat description data described in the STIX form. The threat information output unit 107 may, for example, generate a description specifying a file by use of an extracted file name and a hash value of the file and in accordance with a method stipulated in the CybOX specification. The threat information output unit 107 may also, for example, generate a description specifying a network connection destination by use of extracted address information and in accordance with a method stipulated in the CybOX specification. In addition, for example, the threat information output unit 107 may generate a description representing a "Course of Action" stipulated in the STIX specification. The generation of threat description data enables the threat information output unit 107 to, for example, inform a security device 300, which will be described later, of performance of specific processing (for example, shut-off of communication and the like).

The threat information output unit 107 provides the security device 300 with generated threat description data. The threat information output unit 107 may generate threat description data in a form of a file and provide the security device 300 with the file. Note that, when a plurality of security devices 300 exist, the threat information output unit 107 provides each security device 300 with appropriate threat description data.

The security device 300 is a device capable of performing various types of security measures in an information system. The security device 300 may be a physical device or a virtual device. The security device 300 may be, for example, a network device, such as a router, a firewall, and an intrution detection system (IDS), or an information processing device capable of providing functions of a proxy server, a web application server, a file server, a directory server, and the like.

The security device 300 is, for example, capable of interpreting data described in a standard form, such as STIX, CybOX, and OpenIOC, and performs appropriate processing, based on a result of interpretation of the threat description data. For example, the security device 300 may interpret threat description data and shut off communication with a specific communication target (for example, a control server of a botnet prepared by an attacker, and the like). The security device 300 may also interpret threat description data and suppress execution of a specific file. The processing that the security device 300 performs is not limited to the above processing and may be set appropriately.

[Description of Operation]

Next, an operation of the information analysis system 100, which is configured as described above, will be described with reference to flowcharts exemplified in FIGS. 7 to 11. Note that the flowcharts exemplified in FIGS. 7 to 11 are an example of an operation of the information analysis system 100 and the present example embodiment is not limited to the example. The execution sequence of the processing steps in the respective flowcharts may be altered within a range not influencing a processing result, and one or more processing steps may be executed in parallel.

First, the information collection unit 101 in the information analysis system 100 acquires a piece(s) of reference information from an information source via a communication network. Specifically, the public information collection unit 101a collects (downloads) a piece(s) of reference information from an information source (a Web site, social media, and the like) connected via the communication network 200 (step S701). Such a piece(s) of reference information may be various types of text data or data such as an image, a video, and a voice, as described above.

The public information collection unit 101a provides the information storing unit 102 (specifically, the information database 102a) with the piece(s) of reference information acquired in step S701. The information database 102a stores the provided piece(s) of reference information (step S702). On this occasion, a piece of information indicating a timing (time and the like) at which each piece of reference information was acquired may be stored in conjunction with the piece of reference information in the information database 102a. The information database 102a may also store each of the provided piece(s) of reference information in chronological order every time the piece of reference information is acquired.

The non-public information collection unit 101b collects (downloads) a piece(s) of reference information from a non-public information source via the communication network 200 (step S801). The non-public information source is, for example, a specific site shared with a partner in a trusted relationship (for example, a shared folder, a shared Web site, and the like connected to the communication network 200). Such a piece(s) of reference information may be various types of text data or data such as an image, a video, and a voice, as described above.

The non-public information collection unit 101b provides the information storing unit 102 (specifically, the information database 102a) with the piece(s) of reference information acquired in step S801. The information database 102a stores the provided piece(s) of reference information (step S802). On this occasion, a piece of information indicating a timing (time and the like) at which each piece of reference information was acquired may be stored in conjunction with the piece of reference information in the information database 102a. The information database 102a may also store each of the provided piece(s) of reference information in chronological order every time the piece of reference information is acquired.

The above-described processing performed by the public information collection unit 101a or the non-public information collection unit 101b may be performed periodically (for example, at a fixed time interval) or performed at other appropriate timings. In addition, the above-described processing performed by the public information collection unit 101a or the non-public information collection unit 101b may be performed in a sequential manner or performed in a parallel manner.

Next, the information aggregation unit 103 analyzes each piece of reference information stored in the information database 102a as described above (step S901). Specifically, the information aggregation unit 103, using, for example, morphological analysis and the like, decomposes each piece of reference information into words according to parts of speech. The information aggregation unit 103 may store an analysis result of each piece of reference information in the information database 102a.

Next, the information aggregation unit 103 extracts a piece(s) of reference information that include(s) one or more search words stored in the dictionary database 102b (step S902). The information aggregation unit 103, for example, confirms whether or not a search word stored in the dictionary database 102b is included in a set of words that is a result of the analysis of each piece of reference information. The confirmation enables the information aggregation unit 103 to extract a piece of reference information that includes a search word stored in the dictionary database 102b. The information aggregation unit 103 may perform the above-described processing with respect to each piece of reference information stored in the information database 102a and each search word stored in the dictionary database 102b.

Next, the information aggregation unit 103 extracts a related word(s) related to each search word from the piece(s) of reference information extracted in step S902 (step S903). The information aggregation unit 103 may, for example, extract a related word(s), based on a statistic(s) on a related word candidate(s) (for example, the number(s) of appearances of a related word candidate(s) and the like) included in a piece(s) of reference information including each search word, as described above.

Next, the information aggregation unit 103 stores the extracted related word(s) into the dictionary database 102b (step S904). For example, when a search word is a security term (for example, a word representing some vulnerability and the like), the information aggregation unit 103 may add a related word(s) related to the security term to the dictionary database 102b. That is, the information aggregation unit 103 may collect a word(s) having a strong relationship with a term related to security without depending on knowledge, experience, or the like of users and the like of the information analysis system 100.

Next, the information analysis unit 104 (specifically, the trend detection unit 104a) analyzes a trend of each search word (step S1001).

Figure 11:
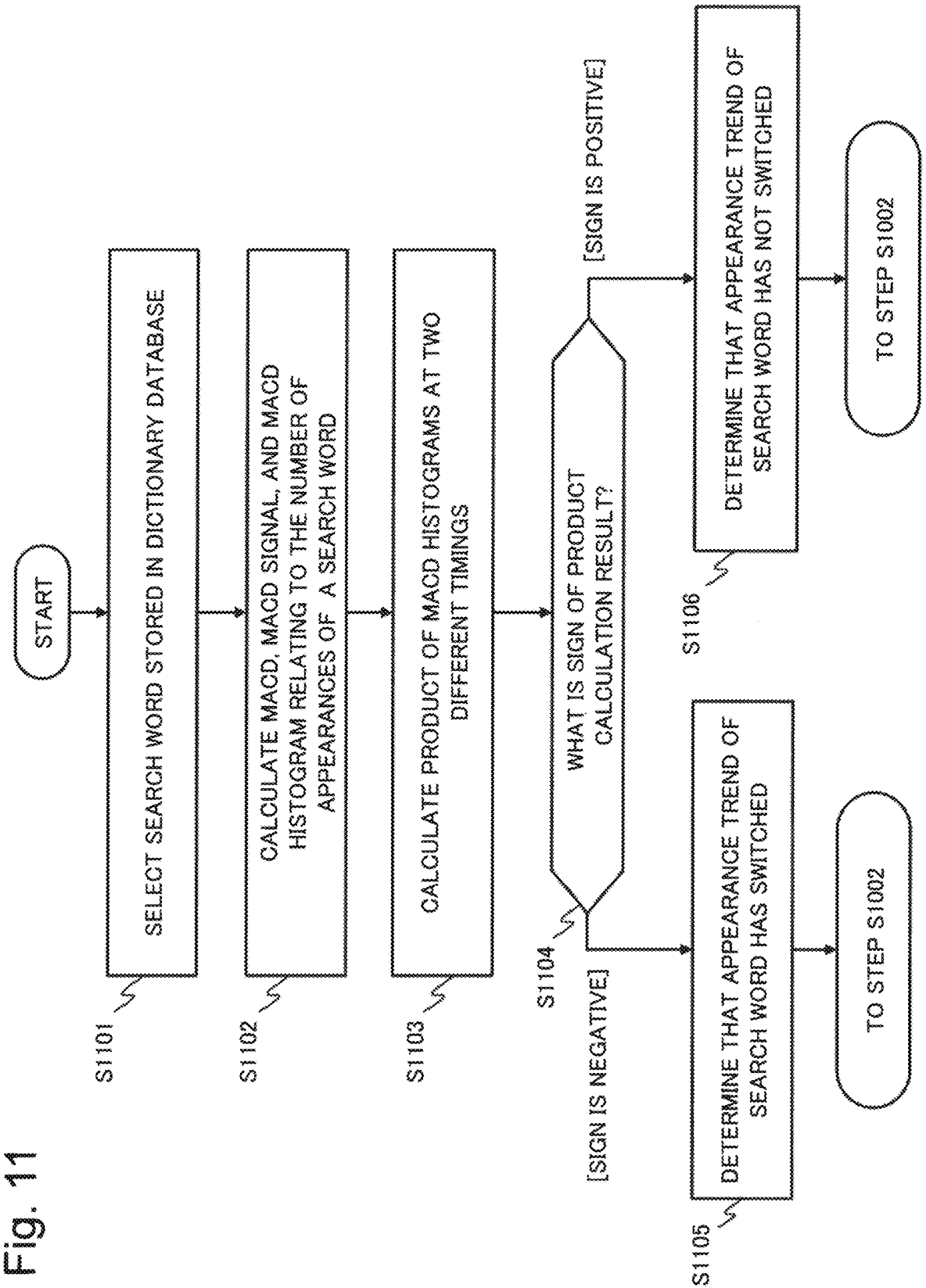
FIG. 11 is a flowchart (5/5) exemplifying an operation of the information analysis system in the first example embodiment of the present invention.

Hereinafter, processing in the trend detection unit 104a will be described using a flowchart exemplified in FIG. 11. The trend detection unit 104a may perform the following processing (steps S1101 to S1106) at periodic timings.

First, the trend detection unit 104a selects a search word stored in the dictionary database 102b (step S1101).

Next, the trend detection unit 104a calculates a MACD, a MACD signal, and a MACD histogram with respect to the number of appearances of the selected search word (step S1102). The trend detection unit 104a may, for example, calculate a MACD, a MACD signal, and a MACD histogram at every predetermined period of time (for example, 1 hour). The trend detection unit 104a may store the calculated MACD, MACD signal, and MACD histogram.

Next, the trend detection unit 104a calculates the product of MACD histograms at two different timings (step S1103). The trend detection unit 104a, for example, calculates the product of a MACD signal at a timing (T) and a MACD signal at a timing (T−1) immediately before the timing (T).

The trend detection unit 104a confirms the sign of a result of the above-described product calculation (step S1104) and, when the sign is negative, determines that the appearance trend of the search word has switched (step S1105). On the other hand, when the sign of a result of the above-described product calculation is positive, the trend detection unit 104a determines that the appearance trend of the search word has not switched (step S1106).

Next, the trend detection unit 104a provides the information output unit 106 with the search word(s) the appearance trend(s) of which is/are determined to have switched in the above-described step S1107 (step S1002).

The information output unit 106, using an appropriate display method, displays the search word(s) the appearance trend(s) of which switched to users of the information analysis system 100 (step S1003). The information output unit 106 may, for example, generate screen data of a user interface screen as exemplified in FIG. 5 and transmit the screen data to a display device.

The search information input unit 105 accepts an input of a piece of information specifying a specific search word (a specified search word) (step S1004). For example, when a user of the information analysis system 100 selects a search word out of the search word(s) displayed in step S1003, a piece of information specifying the selected search word is provided to the search information input unit 105 via the above-described user interface screen. The search information input unit 105 provides the search unit 104b with the search word specified above (the specified search word). The search information input unit 105 may, for example, provide the search unit 104b with a string of letters representing the search word or provide the search unit 104b with a piece of identification information capable of identifying the search word.

The search unit 104b extracts a piece(s) of reference information including the specified search word provided in step S1004 from the information database 102a (step S1005). The search unit 104b provides the information output unit 106 and the threat information output unit 107 with the extracted piece(s) of reference information.

The information output unit 106 presents the piece(s) of reference information including the specified search word to users of the information analysis system 100 (step S1005). On this occasion, the information output unit 106 may generate screen data of a user interface screen that displays a result of technical analysis (appearance trend) relating to the specified search word as exemplified in, for example, FIG. 6.

The threat information output unit 107 generates threat description data, based on the piece(s) of reference information including the specified search word (step S1006). Specifically, the threat information output unit 107 generates threat description data described in a standard form, such as STIX, CybOX, and OpenIOC.

The threat information output unit 107 provides the security device 300 with the threat description data generated in step S1006 (step S1007).

The information analysis system 100 in the present example embodiment, configured as described above, may, for example, detect information relating to a threat in security at the right time. This is because the trend detection unit 104a, based on pieces of reference information collected from various types of information sources, determines an appearance trend of a search word, including security terms (or words related to security terms). An appearance trend of a search word is considered to be related to an occurrence, expansion, subsidence, and the like of a security event. Therefore, by confirming a trend of such a search word, the information analysis system 100 may detect information relating to a threat in security at the right time.

In addition, the information analysis system 100, for example, enables users of the information analysis system 100 to confirm threat information appropriately and easily. This is because the information output unit 106 presents a specified search word and a piece(s) of reference information related to the specified search word to the users.

Further, the information analysis system 100 may store a related word that has a relationship with a search word (for example, a security term) as a new search word in the dictionary database 102b. This capability causes a security term or a related word related to the security term to be stored as a target of trend analysis without users of the information analysis system 100 adding a search word explicitly. When analysis of an appearance tendency with respect to the related word by the trend detection unit 104a resulted in a switch in the appearance trend of the related word, the information output unit 106 displays a piece(s) of reference information relating to the related word. This display enables users to, for example, collectively confirm a piece(s) of reference information relating to a search word and a related word thereto the appearance tendency(ies) of which have changed in relation to a threat (a cyberattack and the like) as time passes. That is, a user of the information analysis system 100 may collectively confirm information that changes in relation to a threat as time passes without depending on knowledge or experience of the user.

Moreover, the information analysis system 100 may provide the security device 300 with standardized threat description data that enables an appropriate security measure to be applied. This capability, for example, enables a security measure, such as access restriction to an external site or suppression of access to or execution of a file, to be performed. The security device 300 that is capable of interpreting threat description data described in a standardized form may perform an appropriate measure, based on the description of threat description data without users and the like adjusting settings manually. Therefore, the information analysis system 100 enables a risk of information leakage, a risk of infection with malware, other risks caused by connection to a harmful site, and the like to be reduced.

Specific Example

Hereinafter, an operation of the information analysis system 100 will be described using a specific example. The following specific example is an example for description purposes, and the present example embodiment is not limited to the specific example. In the following specific example, it is assumed that the public information collection unit 101a acquires pieces of reference information from social media (specifically, Twitter (Registered Trademark)). It is also assumed that, in the dictionary database 102b, a word "vulnerability", which is a security term, is stored as a search word.

The information collection unit 101 (the public information collection unit 101a) collects various types of pieces of information from social media (in the present specific example, for example, Twitter (Registered Trademark)) via the communication network 200. In the present specific example, the public information collection unit 101a provides the information database 102a with pieces of information including the word "vulnerability" out of acquired various types of pieces of information as pieces of threat information. The public information collection unit 101a may collect pieces of public information other than pieces of information from the above-described social media. In addition, the non-public information collection unit 101b may acquire various types of pieces of information including a search word stored in the dictionary database 102b and provide the information database 102a with the acquired pieces of information as pieces of threat information.

The information database 102a stores pieces of reference information (threat information) that the information collection unit 101 acquired in, for example, a form as exemplified in FIG. 12. Note that, in FIG. 12, portions of data are expressed using a turned letter ("*"). In addition, URLs exemplified in FIG. 12 are imaginary URLs for description purposes.

The information aggregation unit 103 analyzes one or more pieces of reference information stored in the information database 102a and, for example, extracts pieces of reference information including the word "vulnerability". The information aggregation unit 103 extracts a phrase (a word) that is included in the extracted pieces of reference information that have a relationship with the word "vulnerability" as a related word. In the present specific example, it is assumed that, for example, a word "Dyreza" is extracted as a related word. Note that "Dyreza" is a word representing well-known malware.

The information aggregation unit 103 stores the extracted related word (in the present specific example, "Dyreza") into the dictionary database 102b newly as a search word. The information collection unit 101 may, for example, collect a piece of information including the newly added search word "Dyreza" from the information source and stores the collected piece of information into the information database 102a as a piece of reference information.

The trend detection unit 104a analyzes an appearance trend of each search word stored in the dictionary database 102b using a technical analysis method. The trend detection unit 104a, for example, calculates the product of a MACD histogram value at a specific timing (for example, a present time) and a MACD histogram value at a timing previous to the specific timing (for example, 1 hour before) periodically (for example, every 1 hour) with respect to each search word. On this occasion, the trend detection unit 104a may calculate the number (count) of appearances, a MACD, and a MACD signal of each search word. When the HV is used for determination of an appearance trend of a search word, the trend detection unit 104a may also calculate an HV value relating to each search word.

Figure 13:
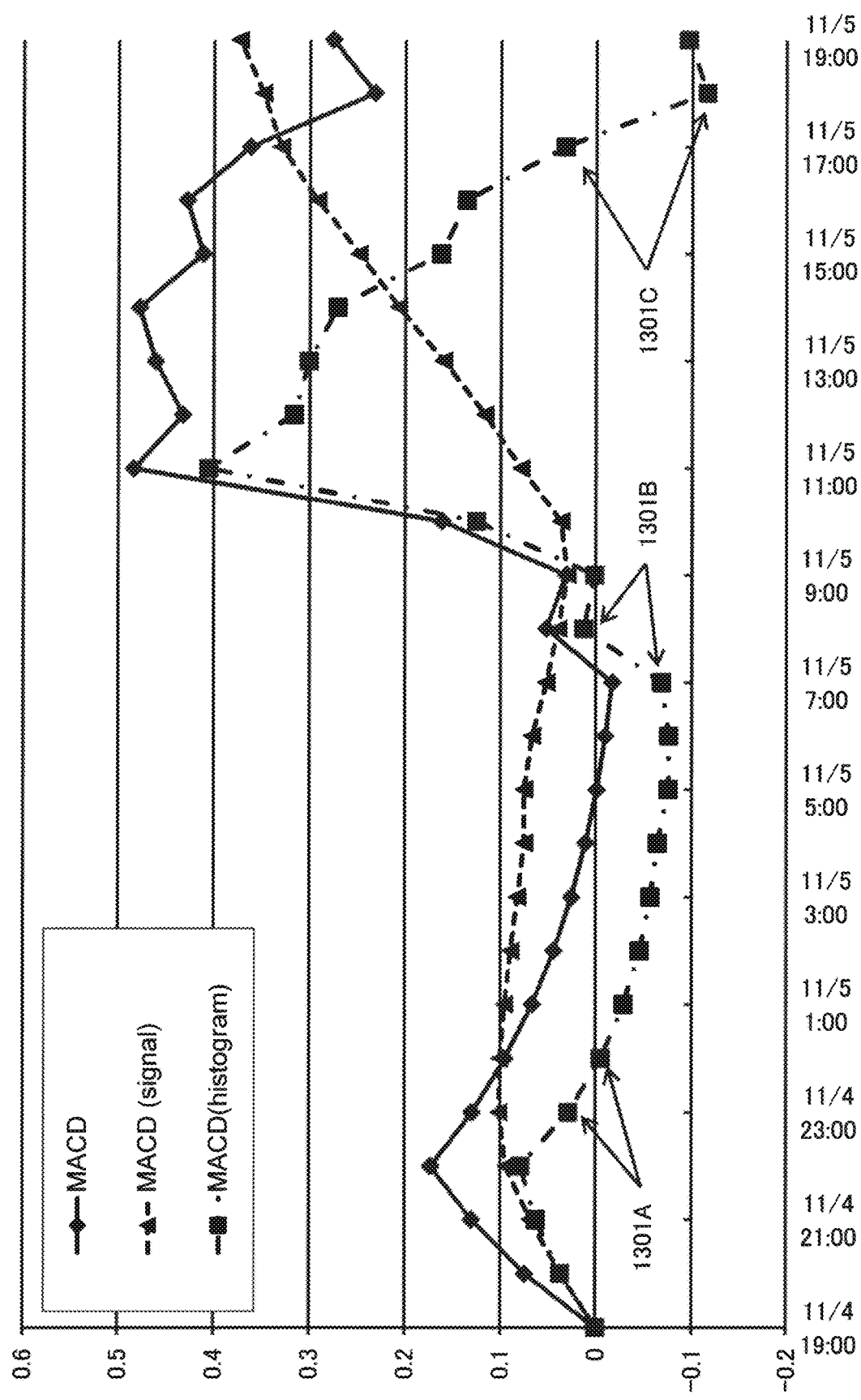
FIG. 13 is graphs (part 1) illustrating results of technical analysis calculated with respect to the number of appearances of a search word in the specific example described in the first example embodiment of the present invention.
Figure 14:
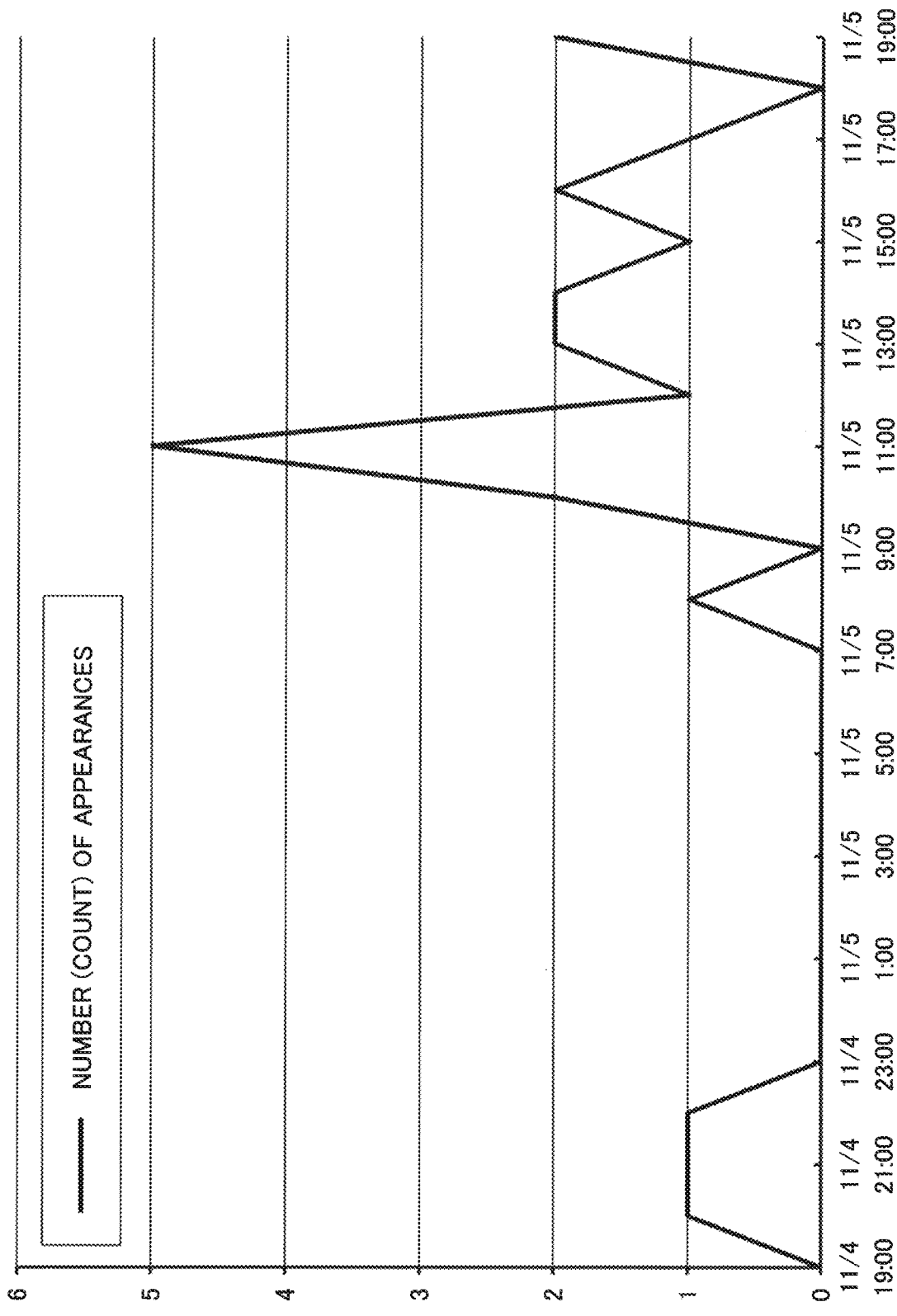
FIG. 14 is a graph illustrating a transition in the number of appearances of the search word in the specific example described in the first example embodiment of the present invention.
Figure 15:
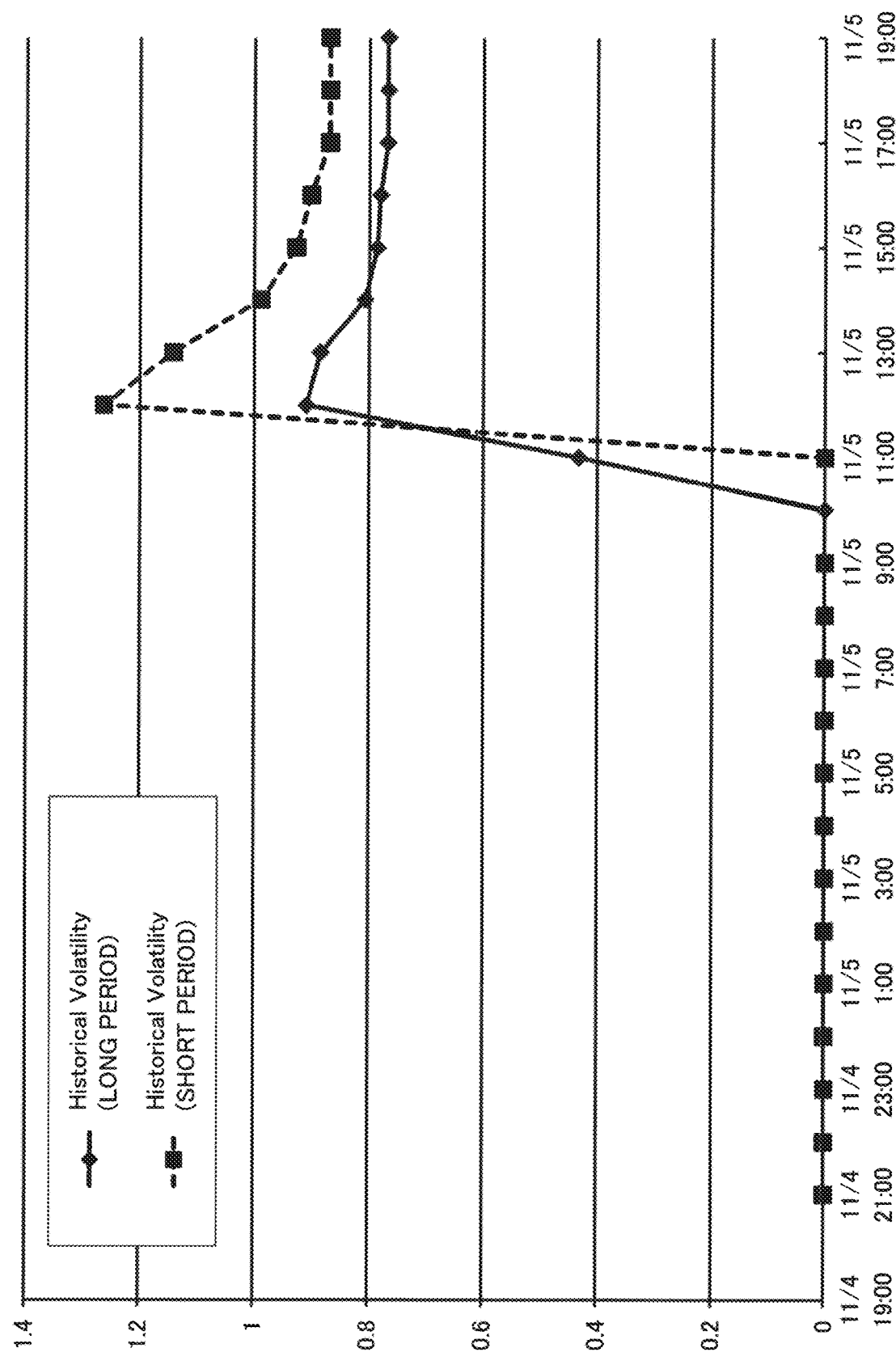
FIG. 15 is graphs (part 2) illustrating results of technical analysis calculated with respect to the number of appearances of the search word in the specific example described in the first example embodiment of the present invention.

FIG. 13 is graphs illustrating specific examples of MACDs, MACD signals ("MACD (signal)" in FIG. 13), and MACD histograms ("MACD (histogram)" in FIG. 13) that are calculated at respective timings with respect to the search word "vulnerability". FIG. 14 is a graph illustrating a specific example of the numbers of appearances of the search word "vulnerability" at respective timings. FIG. 15 is graphs illustrating specific examples of HV over a long period and HV over a short period that are calculated at respective timings with respect to the search word "vulnerability".

In the case of FIG. 13, the products of MACD histograms become negative at pairs of consecutive timings respectively indicated by 1301A, 1301B, and 1301C. Note that, in the present specific example, it is assumed that the product of MACD histograms also becomes negative at a timing with respect to the search word "Dyreza" stored in the dictionary database 1202b. In each of these cases, the trend detection unit 104a determines that the appearance tendency(ies) of the search words "vulnerability" and "Dyreza" switched and provides the information output unit 106 with the search words. On this occasion, the trend detection unit 104a may provide the information output unit 106 with pieces of reference information relating to the search words, a result of the technical analysis relating to the search words, and the like.

Figure 16:
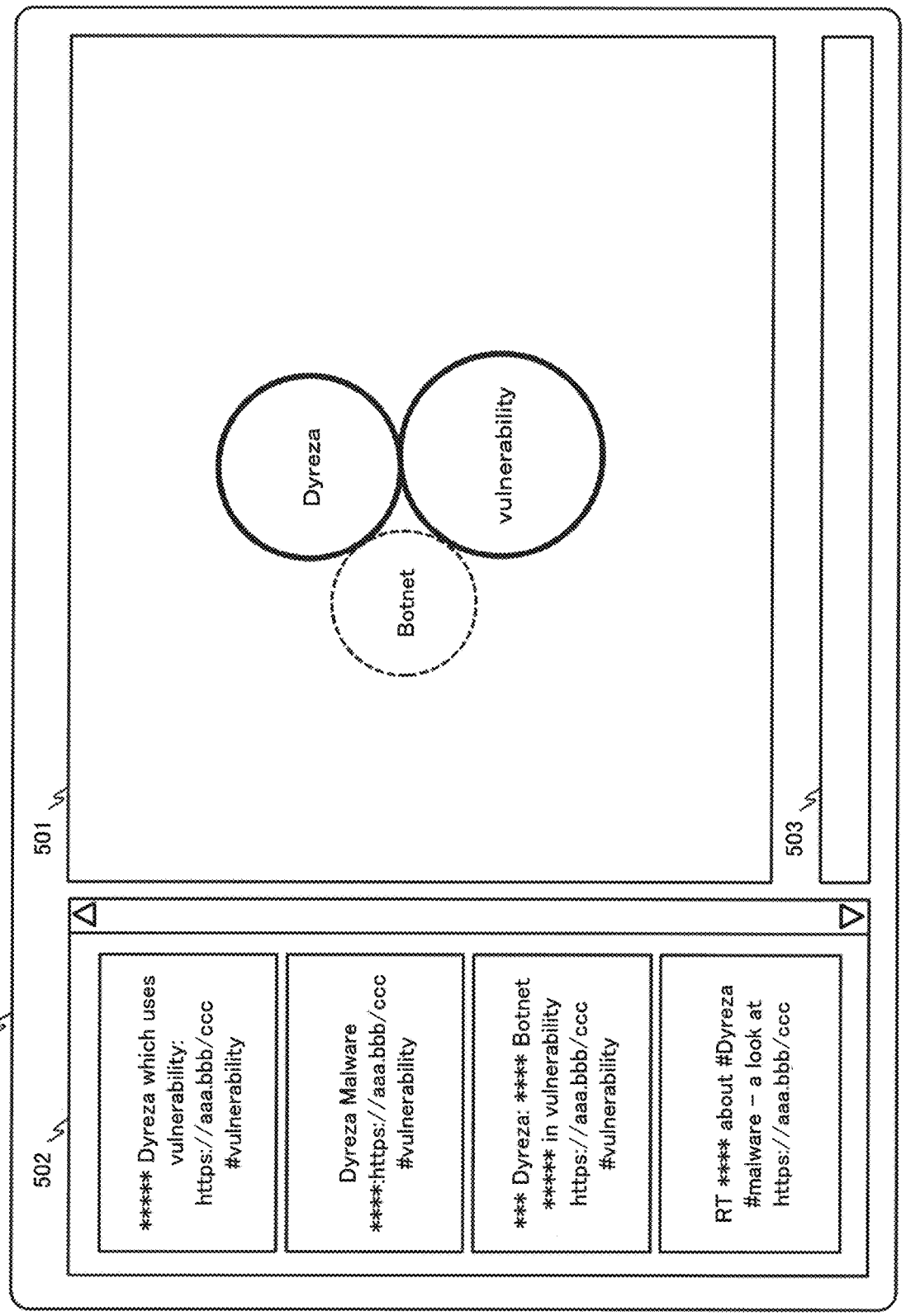
FIG. 16 is an explanatory diagram illustrating a specific example of a user interface generated by the information analysis system in the specific example described in the first example embodiment of the present invention.

The information output unit 106 may, for example, generate a user interface screen as exemplified in FIG. 16. In the display area 501, trend-switched words ("vulnerability" and "Dyreza") are displayed. In the display area 501, for example, another search word (for example, "Botnet" and the like) may be displayed. In the display area 501, pieces of reference information stored in the information database 102a are displayed. The information output unit 106, for example, provides an appropriate display device with the screen data of the generated user interface screen and displays the screen to users of the information analysis system 100 via the display device.

A user of the information analysis system 100, for example, specifies a search word out of search words displayed on the user interface screen. In the present specific example, it is assumed that a user of the information analysis system 100 specifies "Dyreza" as a search word. In this case, "Dyreza" serves as a specified search word. The user of the information analysis system 100 may, for example, select (click, touch, or the like) "Dyreza" in the display area 501 illustrated in FIG. 16. The user of the information analysis system 100 may also, for example, directly input the search word "Dyreza" into the input area 503. In response to such an operation by the user, a piece of information representing the search word "Dyreza" is input to the search information input unit 105. The search information input unit 105 provides the search unit 104b with the search word ("Dyreza") specified by the user.

The search unit 104b searches the information database 102a for a piece of reference information including the search word ("Dyreza"). The search unit 104b provides the information output unit 106 with the search word ("Dyreza") and a piece(s) of reference information found in the search. The search unit 104b may also provide the threat information output unit 107 with the search word and the piece(s) of reference information found in the search.

The information output unit 106, which accepted the piece(s) of reference information which was/were found in the search by the search unit 104b, may, for example, generate a user interface screen as exemplified in FIG. 6. In this case, in the display area 601, the piece(s) of reference information including the search word ("Dyreza") is/are displayed. In addition, in the display area 602, a result of technical analysis relating to the search word ("Dyreza") may be displayed. The information output unit 106 provides a display device with the data of the generated user interface screen and displays the screen to the user of the information analysis system 100 via the display device.

The threat information output unit 107 analyzes the provided piece(s) of reference information and generates threat description data related to the specified search word using a standardized structured threat information form.

The threat information output unit 107, for example, extracts address information and information capable of specifying a file(s) from the piece(s) of reference information including "Dyreza". The address information includes, for example, the address of a server (a control server prepared by an attacker) to which the malware "Dyreza" connects. The information capable of specifying a file(s) includes, for example, the file names or the hash values of an executable file of the malware "Dyreza" and a library file(s) called from the executable file.

The threat information output unit 107, for example, generates threat description data using the above-described extracted information. In the present specific example, the threat information output unit 107 generates threat description data described in, for example, the STIX form. In this case, the threat information output unit 107 generates, for example, a description specifying a communication destination having an IP address (for example, a server with which the malware communicates) in a form as exemplified in FIG. 17. In addition, the threat information output unit 107 generates, for example, a description specifying a file having a file name (for example, an executable file of the malware) in a form as exemplified in FIG. 18.

The threat information output unit 107 provides the security device 300 (for example, a firewall and a web application filter) with the generated threat description data. The security device 300 may, for example, perform various types of access control, based on the threat description data accepted from the threat information output unit 107. Specifically, the security device 300 may shut off communication with the specified IP address. The security device 300 may also suppress access to or execution of the specified file.

Consequently, the information analysis system 100 may detect information relating to a threat in security at the right time. This is because the trend detection unit 104a may determine an appearance trend of a security term (for example, "vulnerability" and "Dyreza") using a technical analysis method.

In addition, the information aggregation unit 103 extracts another word ("Dyreza") that has a strong relationship with a security term (for example, "vulnerability") and adds the extracted word to the dictionary database 102b as a new search word. The addition enables the trend detection unit 104a to also determine an appearance trend of a phrase (word) that is not stored in the dictionary database 102b and that represents a new threat. That is, users may confirm information representing a threat that has newly occurred at the right time without adding a search word explicitly.

In addition, the threat information output unit 107 provides the security device 300 with threat description data described in a standard form. The provision enables each security device 300 to perform an appropriate security measure, based on the threat description data without users of the information analysis system 100 setting the security device 300 directly.

Second Example Embodiment

Next, a second example embodiment that is a basic example embodiment of the present invention will be described. Hereinafter, the same components as those in the above-described first example embodiment are provided with the same reference signs and descriptions thereof will be omitted.

Figure 19:
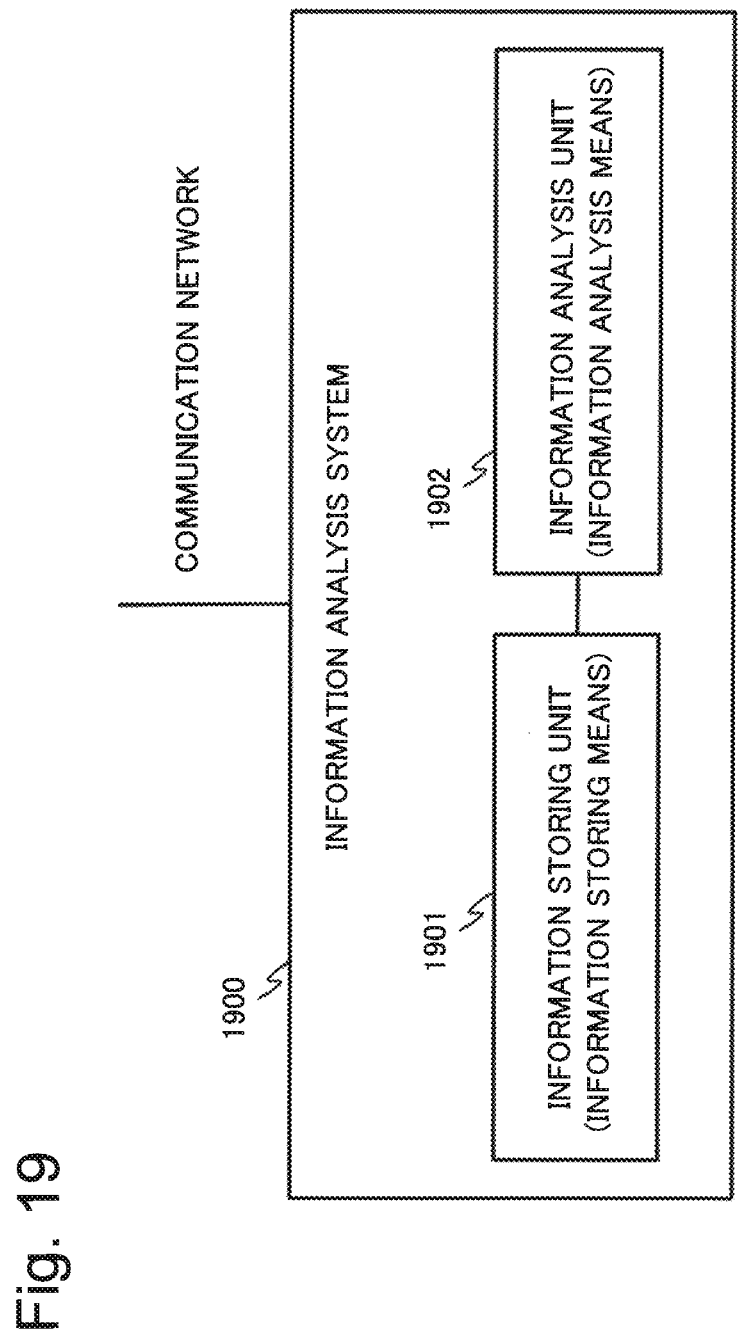
FIG. 19 is a block diagram exemplifying a functional configuration of an information analysis system in a second example embodiment of the present invention.

FIG. 19 is a block diagram exemplifying a functional configuration of an information analysis system 1900 in the present example embodiment. As exemplified in FIG. 19, the information analysis system 1900 includes an information storing unit 1901 (an information storing means) and an information analysis unit 1902 (an information analysis means). These components constituting the information analysis system 1900 are interconnected in a communicable manner using an appropriate communication method. Note that the information analysis system 1900 may be connected to various types of information sources (not illustrated) via a communication network. Hereinafter, the respective components of the information analysis system 1900 will be described.

The information storing unit 1901 stores pieces of reference information acquired from information sources. The information storing unit 1901 may store pieces of reference information using, for example, a physical or virtual storage device. The pieces of reference information may, as with the above-described first example embodiment, be text data or binary data, such as a voice, an image, a video, and an executable file. The information storing unit 1901 may, for example, have a similar configuration to that of the information storing unit 102 in the above-described first example embodiment. In addition, the information storing unit 1901 may, for example, perform similar processing to that performed by the information storing unit 102 in the above-described first example embodiment.

The information analysis unit 1902 determines whether or not an appearance tendency of a piece of first phrase information that is included in pieces of reference information acquired at chronologically different timings and that represents a phrase related to security has changed. When determining that the appearance tendency of the piece of first phrase information has changed, the information analysis unit 1902 extracts a piece(s) of reference information including the piece of first phrase information. The piece of first phrase information may represent a wide variety of phrases, such as security terms used in the security field and phrases having a relationship with security terms. The piece of first phrase information may, for example, be a piece of information representing a search word in the above-described first example embodiment.

The information analysis unit 1902 may, for example, have a similar configuration to that of the information analysis unit 104 in the above-described first example embodiment. In addition, the information analysis unit 1902 may, for example, perform similar processing to that performed by the information analysis unit 104 in the above-described first example embodiment.

The information analysis system 1900 in the present example embodiment, configured as described above, may, for example, detect information relating to a threat in security at the right time. The reason for the capability is because the information analysis unit 1902, based on pieces of reference information collected from various types of information sources, analyzes an appearance tendency of a piece of first phrase information representing a phrase related to security (for example, a security term or a phrase related to the security term). The reason for the capability is also because the information analysis unit 1902, based on a result of the analysis, extracts a piece(s) of reference information including the piece of first phrase information the appearance tendency of which changed. Since an appearance tendency of a piece of first phrase information is considered to be related to an occurrence, expansion, subsidence, and the like of a security event, confirmation of such an appearance tendency enables information relating to a threat in security to be detected at the right time.

Consequently, the information analysis system 1900 in the present example embodiment, configured as described above, may, by analyzing an appearance tendency of information related to a threat in security (for example, a piece of first phrase information), detect information relating to the threat appropriately.

Variation of Second Example Embodiment

Hereinafter, a variation of the above-described second example embodiment will be described. A configuration of an information analysis system 1900 in the present variation may be considered to be similar to that of the above-described second example embodiment.

In the present variation, an information analysis unit 1902, for example, analyzes a time series of the number of appearances of a piece of first phrase information included in pieces of reference information using a technical analysis method and calculates one or more pieces of data representing an appearance tendency of the piece of first phrase information. The information analysis unit 1902, for example, determines whether or not the appearance tendency of the piece of first phrase information has changed based on a relationship between the calculated pieces of data. Alternatively, the information analysis unit 1902, for example, determines whether or not the appearance tendency of the piece of first phrase information has changed based on a relationship between the calculated pieces of data and criterion data (for example, some criterion value).

The information analysis unit 1902 may, for example, employ an appropriate method (for example, a method using a MACD, a method using HV, a method using an RSI, a method using a moving average deviation rate, a method using a VR, and the like, described in the above-described first example embodiment) as a technical analysis method.

The above determination processing enables the information analysis system in the present variation to determine an appearance tendency of a piece of first phrase information using, for example, various types of technical analysis methods used in the financial engineering field and the like.

In addition, in the present variation, the information analysis unit 1902 may, for example, calculate pieces of data representing an appearance tendency of the piece of first phrase information at least at two different timings. The information analysis unit 1902 may determine whether or not the appearance tendency of the piece of first phrase information has changed based on a result of comparison of at least some pieces of data with each other out of the calculated pieces of data. The information analysis unit 1902 may also determine whether or not the appearance tendency of the piece of first phrase information has changed based on a result of comparison of at least some pieces of data out of the calculated pieces of data with criterion data (for example, some criterion value).

Specifically, the information analysis unit 1902 may determine whether or not the appearance tendency of the piece of first phrase information has changed based on a magnitude relation or a change in signs between, with respect to the piece of first phrase information, a piece of data representing an appearance tendency at a timing (T) and a piece of data representing an appearance tendency at a timing (T−1) one timing before the timing (T). The information analysis unit 1902 may also determine whether or not the appearance tendency of the piece of first phrase information has changed based on a change in a time series of magnitude relations between pieces of data representing the appearance tendency of the piece of first phrase information and criterion data (for example, a criterion value "0"). In this case, the information analysis unit 1902 may calculate, as pieces of data representing the appearance tendency of the piece of first phrase information, for example, MACDs, MACD signals, MACD histograms, or the like of the piece of first phrase information.

In the present variation, the information analysis unit 1902 may, with respect to, for example, a piece of first phrase information, calculate two or more different types of pieces of data representing the appearance tendency of the piece of first phrase information. The information analysis unit 1902 may determine whether or not the appearance tendency of the piece of first phrase information has changed based on a result of comparison of at least some pieces of data out of the calculated different types of pieces of data with each other. The information analysis unit 1902 may also determine whether or not the appearance tendency of the piece of first phrase information has changed based on a result of comparison of at least some pieces of data out of the calculated different types of pieces of data with criterion data.

The two or more different types of pieces of data representing the appearance tendency of the piece of first phrase information may, for example, be pieces of data representing the appearance tendency of the piece of first phrase information that are calculated over different periods of time. More specifically, such different types of pieces of data may include, for example, a piece of data representing the appearance tendency of the piece of first phrase information over a predetermined period of time and a piece of data representing the appearance tendency of the piece of first phrase information over a period of time longer than the predetermined period of time. Note that the information analysis unit 1902 may, as a piece of data representing the appearance tendency of the piece of first phrase information over a predetermined period of time, calculate, for example, an HV value of the piece of first phrase information.

The information analysis system 1900 in the present variation, configured as described above, may analyze an appearance tendency of a piece of first phrase information using various types of technical analysis methods.

Third Example Embodiment

Next, a third example embodiment of the present invention will be described. Hereinafter, the same components as those in the above-described respective example embodiments are provided with the same reference signs and descriptions thereof will be omitted.

Figure 20:
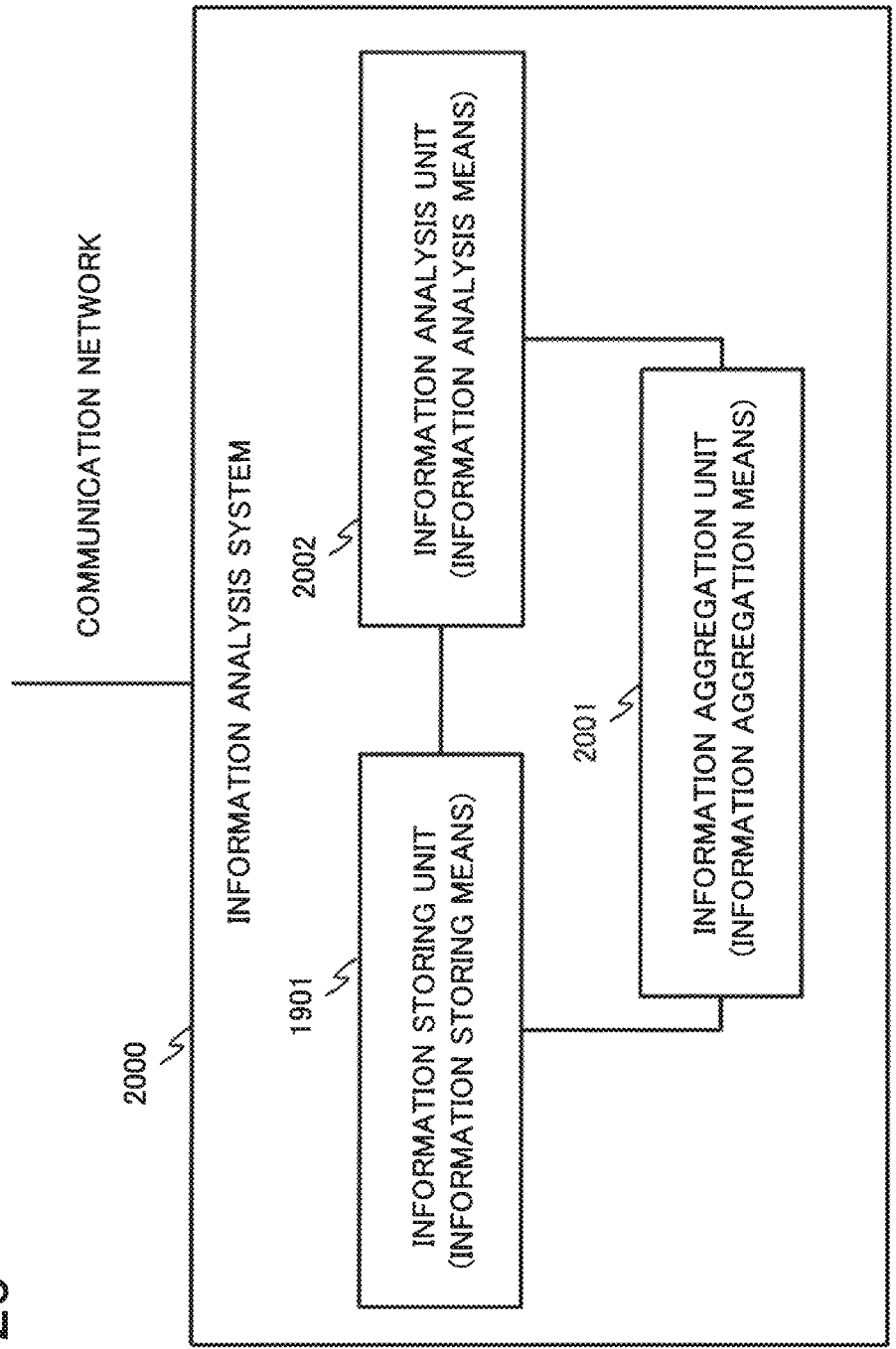
FIG. 20 is a block diagram exemplifying a functional configuration of an information analysis system in a third example embodiment of the present invention.

FIG. 20 is a block diagram exemplifying a functional configuration of an information analysis system 2000 in the present example embodiment. As exemplified in FIG. 20, the information analysis system 2000 in the present example embodiment includes an information storing unit 1901, an information analysis unit 2002, and an information aggregation unit 2001 (an information aggregation means). These components constituting the information analysis system 2000 may be interconnected in a communicable manner using an appropriate communication method. Note that, since the information storing unit 1901 may be considered to be similar to that in the above-described second example embodiment or variation of the second example embodiment, a detailed description thereof will be omitted.

The information aggregation unit 2001 extracts a piece of second phrase information that is included in a piece(s) of reference information including a piece of first phrase information and that represents another phrase having a relationship with the piece of first phrase information. The piece of first phrase information and the piece(s) of reference information are similar to those in the above-described second example embodiment.

The information aggregation unit 2001 may, for example, be configured in a similar manner to the information aggregation unit 103 in the above-described first example embodiment. In addition, the information aggregation unit 2001 may, for example, perform similar processing to that performed by the information aggregation unit 103 in the above-described first example embodiment.

The information aggregation unit 2001 may, for example, extract a piece(s) of information representing (an)other phrase(s) that is/are included in a piece(s) of reference information including the piece of first phrase information and calculate a statistic(s) relating to the piece(s) of information representing the (an)other phrase(s). The information aggregation unit 2001 may, based on the statistic(s), extract at least some piece(s) of information out of the extracted piece(s) of information representing (an)other phrase(s) as a piece(s) of second phrase information. Specifically, the information aggregation unit 2001 may, for example, decompose each of a piece(s) of text data included in one or more pieces of reference information including the piece of first phrase information into one or more words according to parts of speech and, in conjunction therewith, count the number(s) of appearances of at least some word(s) out of the one or more words. In this case, the number(s) of appearances of the some word(s) correspond(s) to the above-described statistic(s). In this case, the information aggregation unit 2001 may extract a predetermined number of word(s) as a piece(s) of second phrase information in descending order of the calculated number of appearances. The information aggregation unit 2001 may also extract a word(s) the number(s) of appearances of which is/are equal to or more than a predetermined criterion value as a piece(s) of second phrase information.

The information analysis unit 2002, using the piece(s) of second phrase information extracted by the information aggregation unit 2001 as a new piece(s) of first phrase information, analyzes an appearance tendency of each of the piece(s) of first phrase information. Note that the information analysis unit 2002 may perform similar processing to that performed by the information analysis unit 1902 in the above-described second example embodiment.

The information analysis system 2000, configured as described above, enables an appearance tendency(ies) of a piece(s) of second phrase information that has/have a relationship(s) with a piece of first phrase information to be also analyzed. In addition, the information analysis unit 2000 may, based on a result of the analysis, extract a piece(s) of reference information including the piece(s) of second phrase information from the information storing unit 1901. The extraction enables the information analysis system 2000 to, for example, collectively extract a piece(s) of reference information including a security term(s) the appearance tendency(ies) of which has/have changed in relation to a security event or a phrases(s) related to the security term(s). Consequently, even when having little prior knowledge or experience related to a security event, users of the information analysis system 2000 may collectively confirm a piece(s) of reference information related to the security event.

Fourth Example Embodiment

Next, a fourth example embodiment of the present invention will be described. Hereinafter, the same components as those in the above-described respective example embodiments are provided with the same reference signs and descriptions thereof will be omitted.

Figure 21:
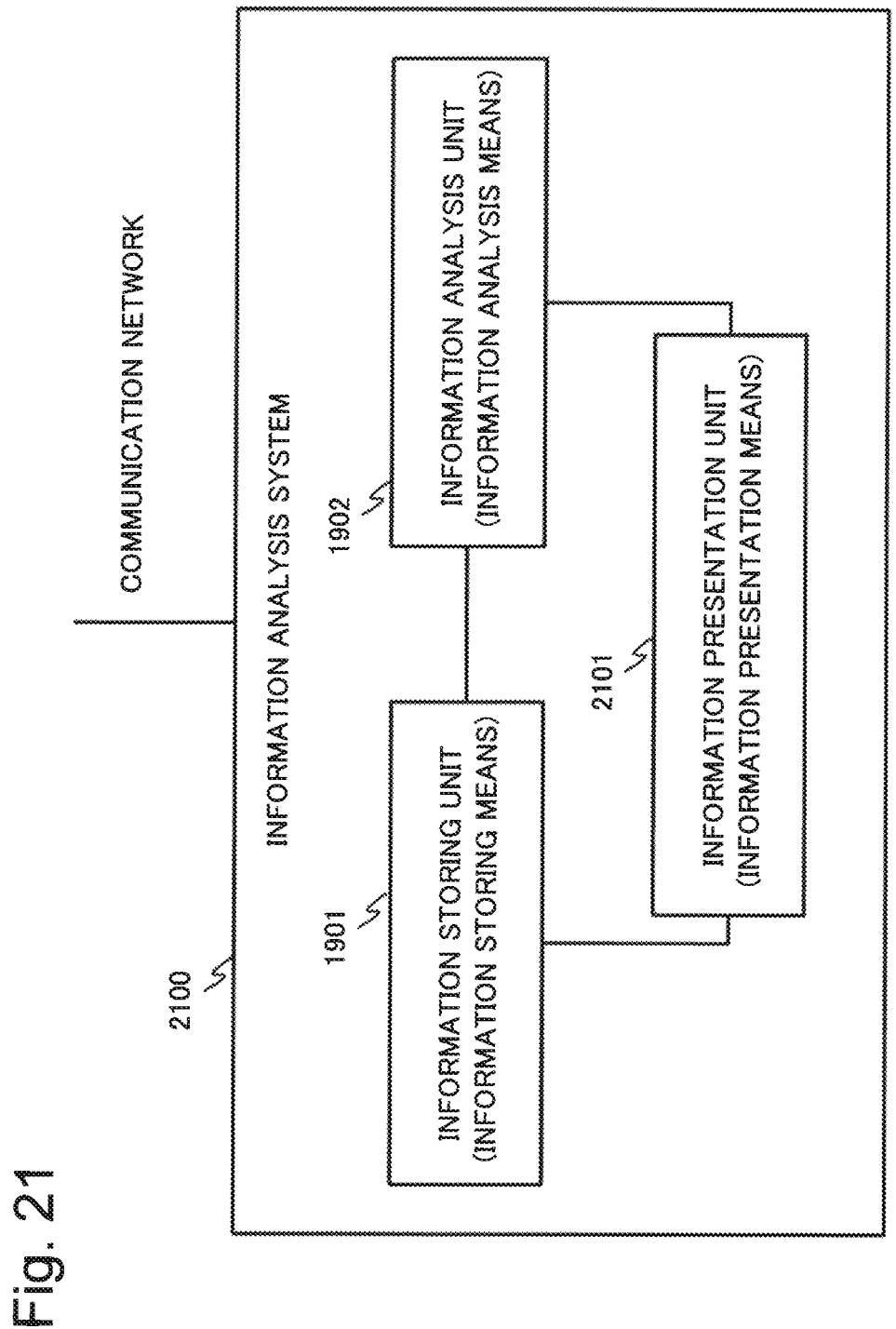
FIG. 21 is a block diagram exemplifying a functional configuration of an information analysis system in a fourth example embodiment of the present invention.

FIG. 21 is a block diagram exemplifying a functional configuration of an information analysis system 2100 in the present example embodiment. As exemplified in FIG. 21, the information analysis system 2100 in the present example embodiment includes an information storing unit 1901, an information analysis unit 1902, and an information output unit 2101 (an information output means). These components constituting the information analysis system 2000 may be interconnected in a communicable manner using an appropriate communication method. Note that, since the information storing unit 1901 and the information analysis unit 1902 may be considered to be similar to those in the above-described second example embodiment or variation of the second example embodiment, a detailed description thereof will be omitted.

The information output unit 2101 generates screen data including at least either a first display area (will be described later) or a second display area (will be described later). The first display area is an area in which a piece(s) of first phrase information the appearance tendency(ies) of which is/are determined to have changed by the information analysis unit 1902 can be displayed. In addition, the second display area is an area in which at least some of a piece(s) of reference information including at least some of a piece(s) of first phrase information displayed in the first display area can be displayed. The piece(s) of first phrase information and the piece(s) of reference information are similar to those in the above-described second example embodiment.

In addition, the information output unit 2101 may generate screen data including at least any of the above-described first display area, the above-described second display area, and a third display area (will be described later). The third display area is an area in which a result from analysis on a time series of the number of appearances of one of the peace(s) of first phrase information performed by the information analysis unit 1902 using a technical analysis method can be displayed.

For the above-described first to third display areas, for example, display forms similar to those of the first to third display areas in the above-described first example embodiment may be employed, respectively. In addition, the information output unit 2101 may be configured in a similar manner to the information output unit 106 in the above-described first example embodiment. Further, the information output unit 2101 may perform similar processing to that performed by the information output unit 106 in the above-described first example embodiment.

The information analysis system 2100, configured as described above, enables users of the information analysis system 2100 to easily confirm a piece(s) of first phrase information the appearance tendency(ies) of which has/have changed and various types of pieces of information (pieces of reference information) related to the piece(s) of first phrase information. This is because the information output unit 2101 generates screen data including a display area in which a result of analysis by the information analysis unit 1902 can be displayed. Presentation of a piece(s) of first phrase information the appearance tendency(ies) of which has/have changed to users of the information analysis system by the information output unit 2101 enables the users to, when, for example, some security event occurred, confirm pieces of information relating to the security event at the right time.

Variation of Fourth Example Embodiment

Next, a variation of the fourth example embodiment described above will be described. Hereinafter, the same components as those in the above-described respective example embodiments are provided with the same reference signs and descriptions thereof will be omitted.

Figure 22:
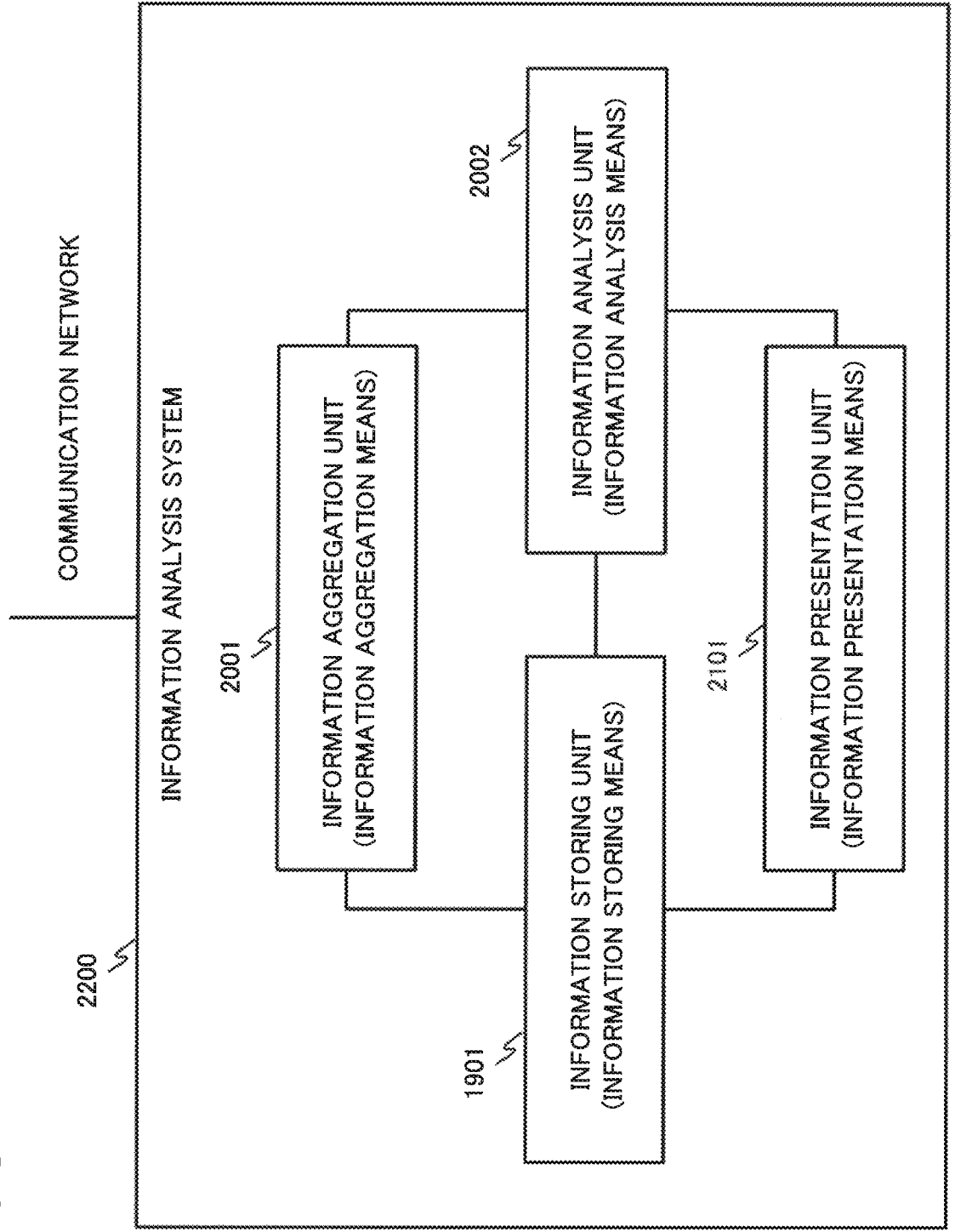
FIG. 22 is a block diagram exemplifying a functional configuration of an information analysis system in a variation of the fourth example embodiment of the present invention.

FIG. 22 is a block diagram exemplifying a functional configuration of an information analysis system 2200 in the present variation. The functional configuration of the information analysis system 2200 in the present variation is similar to a configuration into which the configuration of the information analysis system 2100 in the above-described fourth example embodiment is revised by adding an information aggregation unit 2001 and replacing the information analysis unit 1902 with an information analysis unit 2002.

Since an information storing unit 1901, the information aggregation unit 2001, the information analysis unit 2002, and an information output unit 2101 in the present variation may be considered to be respectively similar to those in the above-described example embodiments, a detailed description thereof will be omitted.

The present variation, configured as described above, enables users of the information analysis system 2200 to, for example, collectively confirm pieces of information related to some security event. This is because the information aggregation unit 2001 extracts a piece(s) of second phrase information having a relationship with a piece(s) of first phrase information and the information analysis unit 2002, using the piece(s) of second phrase information as a new piece(s) of first phrase information, analyzes an appearance tendency(ies) thereof. The information output unit 2101 generating screen data including a piece(s) of reference information or an analysis result(s) relating to the pieces(s) of first and second phrase information enables users of the information analysis system 2200 to collectively confirm the pieces of information.

<Configuration of Hardware and Software Program (Computer Program)>

Hereinafter, a hardware configuration capable of achieving the above-described respective example embodiments will be described.

In the following description, the information analysis systems (100, 1900, 2000, 2100, and 2200) described in the above-described example embodiments are collectively referred to as simply an "information analysis system". In addition, the respective components constituting the information analysis systems are sometimes referred to as simply "components of an information analysis system".

The information analysis system described in each of the above-described example embodiments may be configured with one or a plurality of dedicated hardware devices. In this case, the respective components illustrated in the above-described drawings (FIGS. 1 and 19 to 22) may be achieved using hardware (an integrated circuit in which processing logic is implemented, a storage device, or the like) into which a portion or all of the components are integrated.

When the information analysis system is achieved using dedicated hardware, the components constituting the information analysis system may, for example, be achieved using circuitry capable of providing functions of the respective components. The circuitry includes, for example, an integrated circuit, such as a system on a chip (SoC), a chip set achieved using the integrated circuits, and the like. In this case, data that the components of the information analysis system store may be stored in, for example, a random access memory (RAM) area and a flash memory area, which are integrated into an SoC, or a storage device (a semiconductor storage device and the like) connected to the SoC. In addition, in this case, for a communication line that interconnects the respective components constituting the information analysis system, a well-known communication network may be employed. The communication line that interconnects the respective components may also be configured in such a manner that the respective components are interconnected by peer-to-peer connections.

Figure 23:
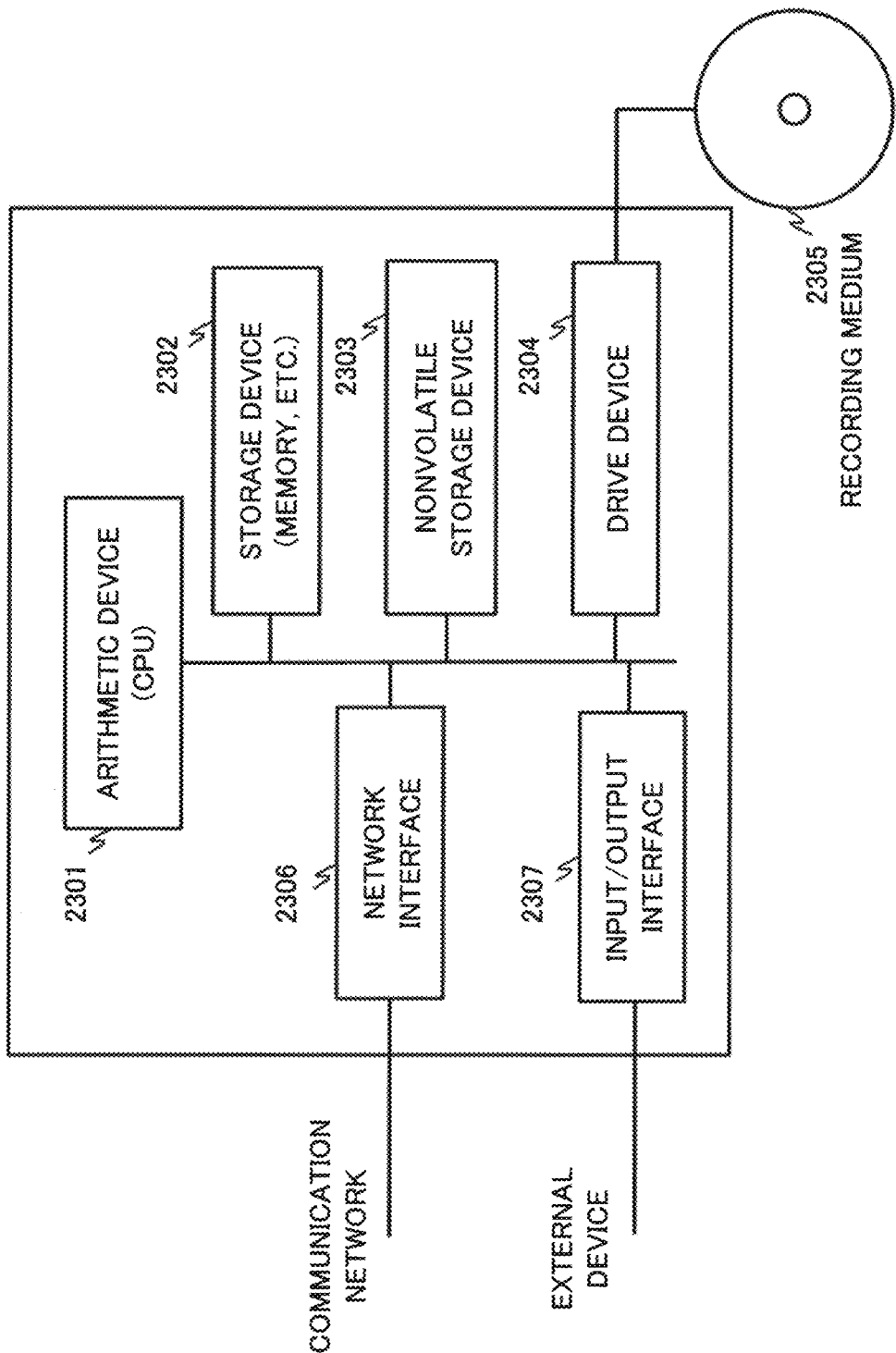
FIG. 23 is a diagram exemplifying a configuration of a hardware device capable of achieving components of information analysis systems in the respective example embodiments of the present invention.

In addition, the above-described information analysis system may be configured with general-purpose hardware as exemplified in FIG. 23 and various types of software programs (computer programs) that are executed by such hardware. In this case, the information analysis system may be configured with an arbitrary number of general-purpose hardware devices and software programs. That is, a separate hardware device may be allocated to each component constituting the information analysis device or a plurality of components may be achieved using a single hardware device.

An arithmetic device 2301 in FIG. 23 is an arithmetic processing device, such as a general-purpose central processing unit (CPU) and a microprocessor. The arithmetic device 2301 may read out, for example, various types of software programs stored in a nonvolatile storage device 2303 to a storage device 2302, which will be described later, and perform processing in accordance with such software programs. For example, the functions of the components constituting the information analysis system in each of the above-described example embodiments may be achieved using software programs executed by the arithmetic device 2301.

A storage device 2302 is a memory device, such as a RAM, that can be referred to from the arithmetic device 2301 and stores software programs, various types of data, and the like. Note that the storage device 2302 may be a volatile memory device.

The nonvolatile storage device 2303 is a nonvolatile storage device, such as a magnetic disk drive and a semiconductor storage device using a flash memory. The nonvolatile storage device 2303 is capable of storing various types of software programs, data, and the like. For example, the information database 102*a* and the dictionary database 102*b* in the information storing unit 102 may be stored in the nonvolatile storage device 2303.

A network interface 2306 is an interface device for connection to a communication network, and, for example, a wired or wireless interface device for LAN connection may be employable for the network interface 2306. For example, the information analysis system may be connected to various types of communication network 200 via the network interface 2306. In addition, when, for example, the security device 300 is connected to the communication network, the threat information output unit 107 may transmit threat description data to the security device 300 via the network interface 2306.

A drive device 2304 is, for example, a device that processes reading and writing of data from/to a recording medium 2305, which will be described later.

The recording medium 2305 is an arbitrary recording medium, such as an optical disk, a magneto optical disk, and a semiconductor flash memory, that is capable of recording data.

An input/output interface 2307 is a device that controls input and output with an external device. For example, the information output unit (106 and 2101) may provide a display device connected via the input/output interface 2307 with screen data.

The information analysis system or the components thereof in the present invention, described using the above-described respective example embodiments as examples, may be achieved by, for example, providing the hardware device exemplified in FIG. 23 with software programs that are capable of achieving functions described in the above-described respective example embodiments. More specifically, the present invention may be achieved by, for example, the arithmetic device 2301 executing software programs provided to the hardware device. In this case, an operating system and middleware, such as database management software, network software, and a virtual environment infrastructure, that are operating in the hardware device may perform a portion of respective processing.

In the above-described respective example embodiments, the respective units illustrated in the above-described respective drawings may be achieved as software modules, which are functional (processing) units of software programs executed by the above-described hardware. However, the division into respective software modules illustrated in the drawings serves as a constitution for the purpose of description, and, upon implementation, various constitutions may be assumed.

When the respective components of the information analysis system exemplified in FIGS. 1 and 19 to 22 are achieved as software modules, the software modules are, for example, stored in the nonvolatile storage device 2303.

When the arithmetic device 2301 subsequently performs the respective processing, the software modules are read out to the storage device 2302.

In addition, the software modules may be configured so as to be able to transmit various types of data to one another using an appropriate method, such as a shared memory and inter-process communication. Such a configuration causes the software modules to be connected to one another in a communicable manner.

Further, the above-described software programs may be recorded in the recording medium 2305. In this case, the above-described software programs may be configured to be appropriately stored in the nonvolatile storage device 2303 through the drive device 2304 at the shipping stage, the operation stage, or the like of the components of the above-described information analysis system.

Note that, in the above-described case, for a method for providing the above-described hardware with various types of software programs, a method of installing the software programs in target devices using an appropriate jig at the manufacturing stage before shipping, the maintenance stage after shipping, or the like may be employed. For the method for providing various types of software programs, a procedure widely used in the present day, such as a method of downloading the software programs from the outside via a communication line such as the Internet, may also be employed.

In such a case, the present invention may be considered to be configured with codes constituting the software programs or a computer-readable recording medium in which such codes are recorded. In this case, such recording media include not only a medium separate from the hardware devices but also a recording medium in which the software programs transmitted via a LAN or the Internet are downloaded and stored or temporarily stored.

In addition, the components constituting the above-described information analysis system may be configured with a virtualized environment into which the hardware devices exemplified in FIG. 23 are virtualized and various types of software programs (computer programs) that are executed in the virtualized environment. In this case, the components of the hardware devices exemplified in FIG. 23 are provided as virtual devices in the virtualized environment. Note that, in this case, the present invention may also be achieved in a similar configuration to that in the case where the hardware devices exemplified in FIG. 23 are configured as physical devices.

The present invention was described above as examples in which the present invention was applied to the above-described typical example embodiments. However, the technical scope of the present invention is not limited to the scope described in the above-described respective example embodiments. It is obvious that those skilled in the art can apply various modifications or improvements to the example embodiments. In such a case, another example embodiment created by applying such modifications or improvements can also be included in the technical scope of the present invention. Further, an example embodiment created by combining the above-described respective example embodiments or another example embodiment created by applying such modifications or improvements can also be included in the technical scope of the present invention. This is obvious from the subject matters described in the claims.

This application claims priority based on Japanese Patent Application No. 2015-243208, filed on Dec. 14, 2015, the entire disclosure of which is incorporated herein by reference.

REFERENCE SIGNS LIST

100 Information analysis system
101 Information collection unit
102 Information storing unit
103 Information aggregation unit
104 Information analysis unit
105 Search information input unit
106 Information output unit
107 Threat information output unit
200 Communication network
300 Security device
1900 Information analysis system
1901 Information storing unit
1902 Information analysis unit
2000 Information analysis system
2001 Information aggregation unit
2002 Information analysis unit
2100 Information analysis system
2101 Information output unit
2200 Information analysis system
2301 Arithmetic device
2302 Storage device
2303 Nonvolatile storage device
2304 Drive device
2305 Recording medium
2306 Network interface
2307 Input/output interface

The invention claimed is:

1. A cyber threat analysis system comprising:
a database configured to store reference information acquired from an information source;
a memory configured to store instructions; and
a processor configured to execute the instructions to:
analyze an appearance tendency of first phrase information that is included in the reference information acquired at chronologically different timings and the appearance tendency of the first phrase information represents a phrase related to a malicious program that provides malicious instructions to an information processing device;
extract the reference information including the first phrase information, the appearance tendency of the first phrase information has changed, from the database;
extract one or more information representing another phrase that is included in the reference information including the first phrase information and has a relationship with the first phrase information;
count a number of appearances of the one or more information representing the another phrase;
based on the number of appearances of the information representing the another phrase, select at least some of the information representing the another phrase as second phrase information;
analyze an appearance tendency of the second phrase information;
generate a user interface screen including the reference information, the first phrase information, and the second phrase information, the appearance tendency of the second phrase information has changed,
when the analysis of the appearance tendency of the second phrase information resulted in a switch in the appearance tendency of the second phrase information;
generate threat description data relating to the first phrase information; and
provide the information processing device with the generated threat description data.

2. The cyber threat analysis system according to claim 1, wherein the processor is further configured to:
using any of moving average convergence divergences (MACDs), MACD signals, and MACD histograms of a time series of a number of appearances of the first phrase information, calculate data representing the appearance tendency of the first phrase information at least at the two different timings.

3. The cyber threat analysis system according to claim 2, wherein the processor is further configured to:
individually calculate MACD histograms of the first phrase information at least at the two different timings; and
when a sign of a product of the calculated MACD histograms is negative, determine that the appearance tendency of the first phrase information has changed.

4. The cyber threat analysis system according to claim 1, wherein the processor is further configured to:
with respect to the first phrase information, calculate two or more different types of data representing the appearance tendency of the first phrase information; and
based on result of comparison between least some data out of the calculated data and a criterion data, determine whether the appearance tendency of the first phrase information has changed.

5. The cyber threat analysis system according to claim 4, wherein the processor is further configured to:
by obtaining a standard deviation of a rate of change in the number of appearances of the first phrase information over a predetermined period of time, calculate data representing the appearance tendency of the first phrase information.

6. The cyber threat analysis system according to claim 1, wherein the processor is further configured to:
decompose text data included in the reference information including the first phrase information into one or more words according to parts of speech;
count a number of appearances of the one or more words; and
extract a predetermined number of information representing the one or more words in descending order of the number of appearances as the second phrase information; or
extract information representing the one or more words, the number of appearances of the one or more words is equal to or more than a criterion value, as the second phrase information.

7. The cyber threat analysis system according to claim 1, wherein the processor is further configured to:
generate the user interface screen including at least either a first display area in which the first phrase information, the appearance tendency of the first phrase information is determined to have changed, can be displayed or a second display area in which at least some of the reference information including at least some of the first phrase information displayed in the first display area can be displayed.

8. The cyber threat analysis system according to claim 7, wherein the processor is further configured to:
generate the user interface screen including at least one of a third display area in which an analysis result on a time-series appearance tendency of the first phrase information that is analyzed using technical analysis method can be displayed, the first display area, and the second display area.

9. The cyber threat analysis system according to claim 1, wherein the processor is further configured to:
using data that are extracted from the reference information including the first phrase information, the appearance tendency of the first phrase information is determined to have changed, and the data conform to a predetermined format, generate the threat description data that describe a threat in security related to the first phrase information and a countermeasure against the threat using a predetermined structured form.

10. The cyber threat analysis system according to claim 9, wherein the processor is further configured to:
extract data capable of specifying a resource in a communication network as data conforming to the predetermined format from the reference information; and
generate the threat description data describing the countermeasure that restricts access to a resource specified by the extracted data.

11. The cyber threat analysis system according to claim 1, wherein a criterion data is a predetermined criterion value.

12. A cyber threat analysis method comprising:
analyzing an appearance tendency of first phrase information that is included in reference information acquired at chronologically different timings from an information source and the appearance tendency of the first phrase information represents a phrase related to a malicious program that provides malicious instructions to an information processing device;
extracting reference information including the first phrase information the appearance tendency of the first phrase information has changed;
extracting one or more information representing another phrase that is included in the reference information including the first phrase information and has a relationship with the first phrase information;
counting a number of appearances of the one or more information representing the another phrase;
based on the number of appearances of the information representing the another phrase, selecting at least some of the information representing the another phrase as second phrase information;
analyzing an appearance tendency of the second phrase information;
generating a user interface screen including the reference information, the first phase information and the second phase information, the appearance tendency of the second phrase information has changed,
when the analysis of the appearance tendency of the second phrase information resulted in a switch in the appearance tendency of the second phrase information;
generating threat description data relating to the first phrase information; and
providing the information processing device with the generated threat description data.

13. The cyber threat analysis method according to claim 12, wherein a criterion data is a predetermined criterion value.

14. A non-transitory computer-readable medium storing a cyber threat analysis program that, when executed by a processor, causes the processor to:
store reference information acquired from an information source;
analyze an appearance tendency of first phrase information that is included in the reference information acquired at chronologically different timings and the appearance tendency of the first phrase information represents a phrase related to a malicious program that provides malicious instructions to an information processing device;

extract reference information including the first phrase information, the appearance tendency of the first phrase information has changed;

extracting one or more information representing another phrase that is included in the reference information including the first phrase information and has a relationship with the first phrase information;

counting a number of appearances of the one or more information representing the another phrase;

based on the number of appearances of the information representing the another phrase, selecting at least some of the information representing the another phrase as second phrase information;

analyzing an appearance tendency of the second phrase information;

generating a user interface screen including the reference information, the first phase information and the second phase information, the appearance tendency of the second phrase information has changed, when the analysis of the appearance tendency of the second phrase information resulted in a switch in the appearance tendency of the second phrase information;

generate threat description data relating to the first phrase information; and provide the information processing device with the generated threat description data.

15. The non-transitory computer-readable medium 17, wherein a criterion data is a predetermined criterion value.

* * * * *